United States Patent
Wakabayashi et al.

(10) Patent No.: US 12,554,183 B2
(45) Date of Patent: Feb. 17, 2026

(54) VIBRATION GENERATION DEVICE, VIBRATION REDUCTION DEVICE, AND ELECTRONIC APPARATUS

(71) Applicant: SEIKO EPSON CORPORATION, Tokyo (JP)

(72) Inventors: Shinichi Wakabayashi, Suwa (JP); Tatsuya Takahashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 456 days.

(21) Appl. No.: 18/175,634

(22) Filed: Feb. 28, 2023

(65) Prior Publication Data

US 2023/0273510 A1 Aug. 31, 2023

(30) Foreign Application Priority Data

Feb. 28, 2022 (JP) ................................ 2022-029116

(51) Int. Cl.
*G03B 21/14* (2006.01)
*H02K 33/18* (2006.01)

(52) U.S. Cl.
CPC ........... *G03B 21/142* (2013.01); *H02K 33/18* (2013.01)

(58) Field of Classification Search
CPC .............................. G03B 21/142; H02K 33/18
USPC ........................................................ 353/101
See application file for complete search history.

(56) References Cited

U.S. PATENT DOCUMENTS

| | | |
|---|---|---|
| 2010/0204881 A1 | 8/2010 | Muragishi et al. |
| 2015/0098130 A1* | 4/2015 | Terajima .............. H04N 23/685 |
| | | 359/557 |
| 2019/0304650 A1 | 10/2019 | Takahashi et al. |
| 2021/0218324 A1 | 7/2021 | Hashimoto et al. |
| 2021/0247671 A1 | 8/2021 | Wakabayashi et al. |
| 2021/0273543 A1 | 9/2021 | Takahashi et al. |
| 2023/0012117 A1* | 1/2023 | Hatano .................. H02K 33/16 |

FOREIGN PATENT DOCUMENTS

| | | | |
|---|---|---|---|
| JP | H11226500 A | * | 8/1999 |
| JP | 2001-304332 A | | 10/2001 |
| JP | 2003-305409 A | | 10/2003 |
| JP | 2007285377 A | | 11/2007 |

(Continued)

OTHER PUBLICATIONS

Translation of JP_2013247810 (Year: 2025).*
Translation of JP_H11226500 (Year: 2025).*

*Primary Examiner* — Jerry L Brooks
(74) *Attorney, Agent, or Firm* — Dority & Manning, P.A.

(57) ABSTRACT

A vibration generation device includes: a base configured to transmit vibration to an object; a pendulum provided at the base swingably around a rotation axis; and at least one driving unit including a magnet that is provided at the pendulum and a coil that is provided at a configuration other than the pendulum and that is disposed to face the magnet in a non-contact manner, and configured to apply a driving force to the pendulum. The pendulum includes a first side surface portion and a second side surface portion that intersect with a direction parallel to the rotation axis and are at opposite sides. A first driving unit includes a first magnet provided at the first side surface portion to be separated from the rotation axis, and a first coil disposed to face the first magnet in a non-contact manner.

16 Claims, 21 Drawing Sheets

(56) References Cited

FOREIGN PATENT DOCUMENTS

| | | | | |
|---|---|---|---|---|
| JP | 2012237448 | A | | 12/2012 |
| JP | 2013247810 | A | * | 4/2015 |
| JP | 2019-180168 | A | | 10/2019 |
| JP | 2020-006344 | A | | 1/2020 |
| JP | 2021-124624 | A | | 8/2021 |
| JP | 2021109165 | A | | 8/2021 |

* cited by examiner

VIBRATION GENERATION DEVICE, VIBRATION REDUCTION DEVICE, AND ELECTRONIC APPARATUS

The present application is based on, and claims priority from JP Application Serial Number 2022-029116, filed Feb. 28, 2022, the disclosure of which is hereby incorporated by reference herein in its entirety.

BACKGROUND

1. Technical Field

The present disclosure relates to a vibration generation device, a vibration reduction device, and an electronic apparatus.

2. Related Art

In the related art, for example, as disclosed in JP-A-2021-109165, a vibration actuator that implements a vibration function of an electronic apparatus is known.

The vibration actuator disclosed in JP-A-2021-109165 includes a fixed body and a movable body that is supported by the fixed body to swing around a shaft portion provided at the fixed body. The movable body is movably supported by the fixed body via a magnetic spring implemented based on an attractive force of a magnet. The movable body includes a core that is a magnetic body and a coil that is wound around the core. Currents of different frequencies flow through the coil, and the movable body moves around the shaft portion which is inserted through a through hole of the core. A flexible substrate that supplies electric power to the coil is provided at one end portion of the core.

The fixed body is formed by combining a base plate and a case. The fixed body includes the magnet and a buffer portion. The magnet can move the movable body in cooperation with the coil of the movable body. A free end of the movable body that vibrates comes into contact with the buffer portion. Accordingly, vibration of the movable body can be transmitted to a housing of the vibration actuator, and the buffer portion can generate large vibration.

However, in the vibration actuator disclosed in JP-A-2021-109165, the magnet is provided at the fixed body, and the coil is wound around the core constituting the movable body. Further, the flexible substrate provided at the core vibrates together with the movable body. With such a configuration, the vibration of the vibration actuator may adversely affect coupling of a wiring for supplying the electric power to the coil in a long term.

Therefore, there is a demand for a vibration generation device having improved reliability.

SUMMARY

A vibration generation device according to a first aspect of the present disclosure includes: a base configured to transmit vibration to an object; a pendulum provided at the base swingably around a rotation axis; and at least one driving unit including a magnet that is provided at the pendulum and a coil that is provided at a configuration other than the pendulum and that is disposed to face the magnet in a non-contact manner, and configured to apply a driving force to the pendulum. The pendulum includes a tip end portion that is an end portion on an opposite side of a center of the pendulum extending from the rotation axis from the rotation axis in an extending direction in which the pendulum extends among directions intersecting with the rotation axis, and a first side surface portion and a second side surface portion that intersect with a direction parallel to the rotation axis and are opposite-side end portions. The at least one driving unit includes a first driving unit. The first driving unit includes a first magnet that is the magnet and is provided at the first side surface portion to be separated from the rotation axis, and a first coil that is the coil and is disposed to face the first magnet in a non-contact manner.

A vibration reduction device according to a second aspect of the present disclosure includes: the vibration generation device according to the first aspect; a detection unit configured to detect vibration of the object; and an operation control unit configured to cause the vibration generation device to generate vibration opposite in phase from the vibration detected by the detection unit.

An electronic apparatus according to a third aspect of the present disclosure includes the vibration reduction device according to the second aspect.

DESCRIPTION OF EXEMPLARY EMBODIMENTS

First Embodiment

Figure 1:
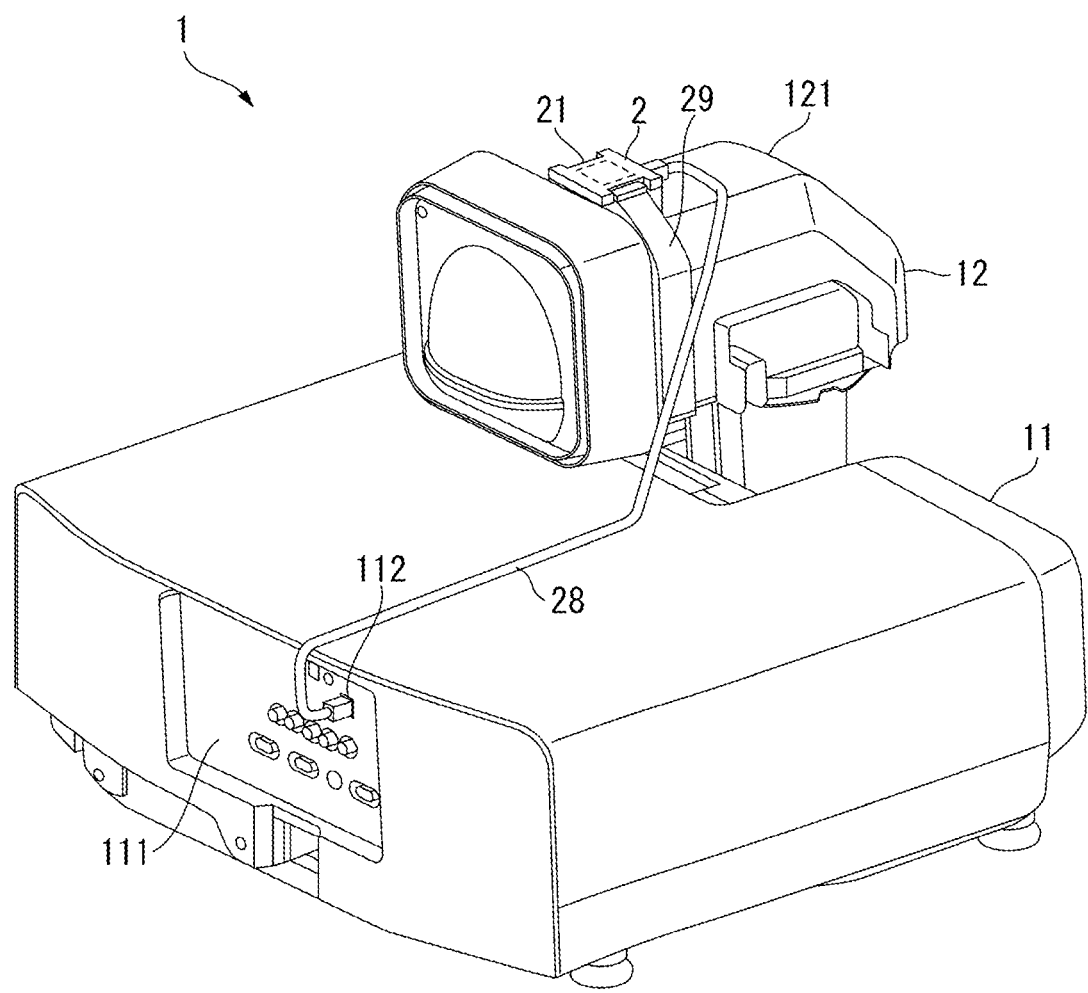
FIG. 1 is a perspective view showing a projector according to a first embodiment.

Hereinafter, a first embodiment according to the present disclosure will be described with reference to the drawings.
Schematic Configuration of Projector FIG. 1 is a perspective view showing a projector 1 according to the embodiment.

The projector 1 according to the embodiment is an electronic apparatus that modulates a light emitted from a light source to form an image light corresponding to image information, and enlarges and projects the formed image light onto a projection surface. As shown in FIG. 1, the projector 1 includes an exterior housing 11, a projection optical device 12, and a vibration reduction device 2. Although not shown, the projector 1 further includes the light source, a light modulation device, a power supply device, a cooling device, and a control device.

The light modulation device modulates the light emitted from the light source to form the image light corresponding to the image information.

The power supply device supplies electric power to electronic components of the projector 1.

The cooling device cools a cooling target provided inside the projector 1.

The control device controls operations of the projector 1.
Configuration of Exterior Housing The exterior housing 11 constitutes an exterior of the projector 1, and houses the light source, the light modulation device, the power supply device, the cooling device, and the control device described above therein. The exterior housing 11 is formed in a substantially rectangular parallelepiped shape.

The exterior housing 11 includes a coupling terminal 112 to which a cable 28 of the vibration reduction device 2 to be described later is coupled in a surface 111 in a projection direction of an image projected by the projection optical device 12. The coupling terminal 112 is, for example, a universal serial bus (USB) terminal, and is used to supply the electric power to the vibration reduction device 2.
Configuration of Projection Optical Device The projection optical device 12 projects the image light formed by the light modulation device described above onto the projection surface. In the embodiment, the projection optical device 12 is detachably attached to the exterior housing 11. That is, the projection optical device 12 is replaceable.

The projection optical device 12 shown in FIG. 1 sequentially bends a traveling direction of the image light incident on the projection optical device 12 in two stages, and projects the image light in a direction opposite from an incident direction of the image light in the projection optical device 12. That is, the projection optical device 12 has a substantially U-shape rotated by 90° counterclockwise when viewed from a direction orthogonal to a direction coupling the surface 111 in the projection direction and a surface on a side opposite from the surface 111 in the projection direction.

The projection optical device 12 includes a lens barrel 121, and further includes a plurality of lenses and a plurality of reflection members (not shown) provided in the lens barrel 121.

Configuration of Vibration Reduction Device

The vibration reduction device 2 is attached to a vibration reduction target, and reduces vibration of the vibration reduction target by generating vibration opposite in phase from the vibration acting on the vibration reduction target. In the embodiment, the vibration reduction device 2 is provided at the lens barrel 121 and reduces vibration acting on the lens barrel 121.

Here, when the vibration is propagated to the projector 1 from an outside, or when the vibration is generated due to an internal factor such as a fan of the projector 1, the projection optical device 12 provided to protrude to an outside of the exterior housing 11 is more likely to greatly vibrate than the exterior housing 11. In this manner, when the projection optical device 12 vibrates, the image projected onto the projection surface by the projection optical device 12 shakes greatly.

From such a problem, in the embodiment, by providing the vibration reduction device 2 at the projection optical device 12, the vibration of the projection optical device 12 is reduced, and therefore the shaking of the image is restricted.

Hereinafter, a configuration of the vibration reduction device 2 will be described in detail.

The vibration reduction device 2 includes a device main body 21, the cable 28, and a fixture 29.

The cable 28 extends from the device main body 21. The cable 28 is coupled to the coupling terminal 112, and supplies the electric power supplied from the coupling terminal 112 to the device main body 21.

The fixture 29 fixes the device main body 21 to the vibration reduction target. In the embodiment, the fixture 29 is implemented by a belt, and is wound around an outer peripheral surface of the lens barrel 121 provided in the projection optical device 12 which is the vibration reduction target. However, the fixture 29 is not limited thereto, and may be a fastening member such as a screw as long as the fixture 29 can fix a housing 22 to the vibration reduction target.

Figure 2:
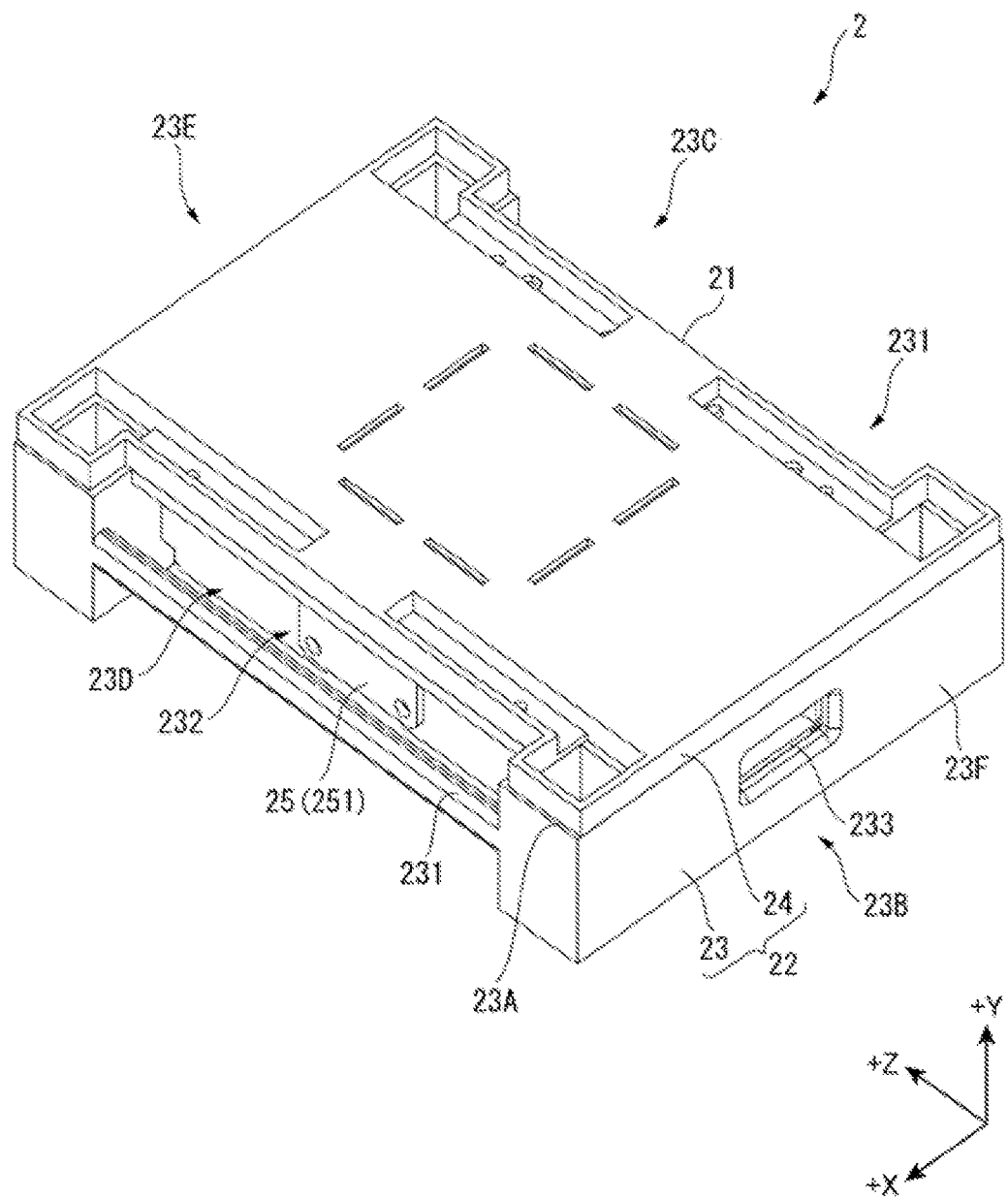
FIG. 2 is a perspective view showing a device main body of a vibration reduction device according to the first embodiment.
Figure 3:
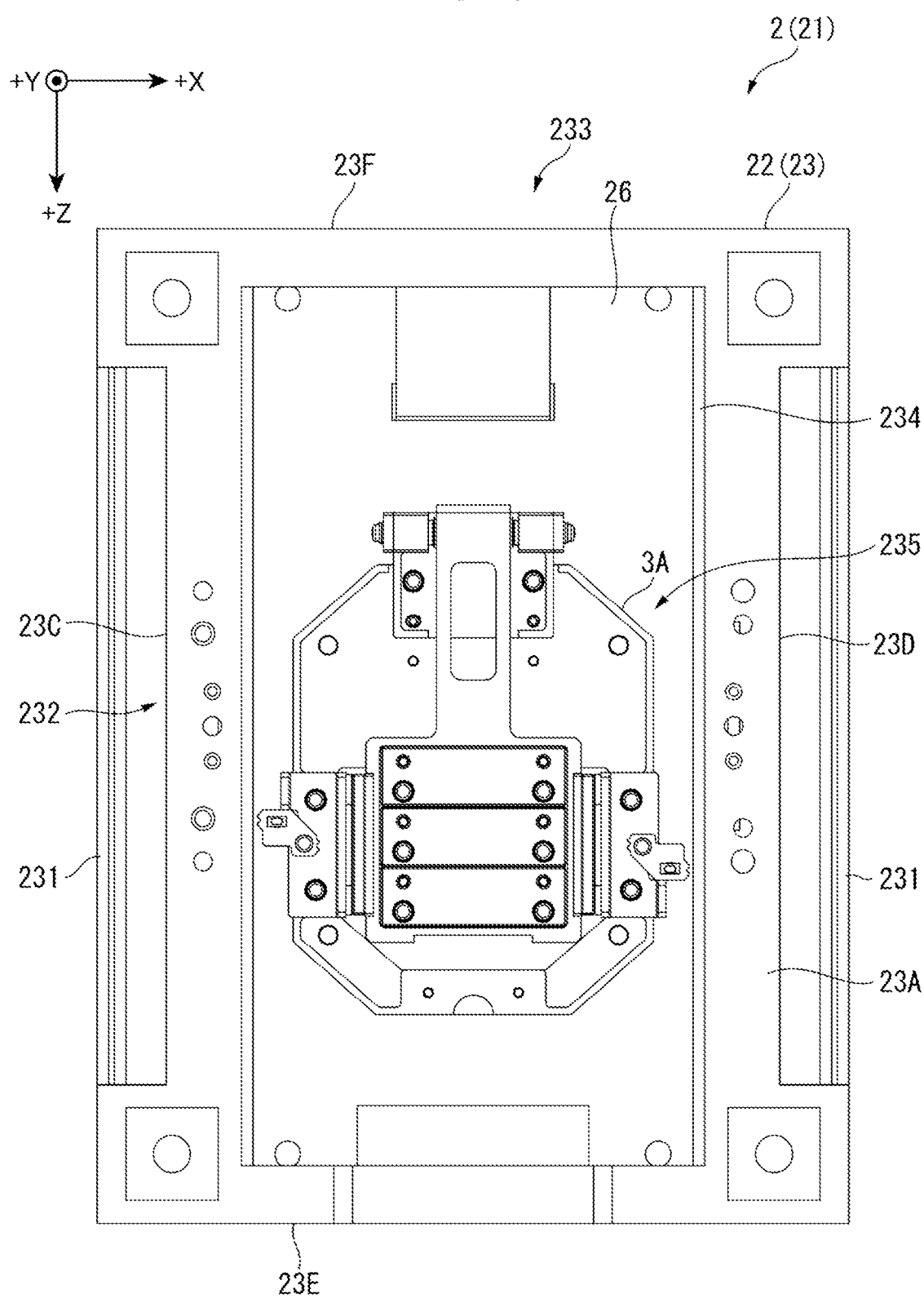
FIG. 3 is a plan view showing the device main body from which a lid member is removed according to the first embodiment.

FIG. 2 is a perspective view showing the device main body 21, and FIG. 3 is a plan view showing the device main body 21 in a state where a lid member 24 is removed.

The device main body 21 generates vibration opposite in phase from the vibration of the lens barrel 121 to reduce the vibration of the lens barrel 121. The device main body 21 includes the housing 22 and a detection unit 25 as shown in FIG. 2, and further includes an operation control unit 26 and a vibration generation device 3A as shown in FIG. 3.

The housing 22 houses the detection unit 25, the operation control unit 26, and the vibration generation device 3A. As shown in FIG. 2, the housing 22 includes a frame 23 and the lid member 24, and is formed in a substantially rectangular parallelepiped shape by combining the frame 23 and the lid member 24.

The lid member 24 is formed in a rectangular plate shape, and is detachably attached to a first surface 23A of the frame 23.

As shown in FIGS. 2 and 3, the frame 23 is formed in a rectangular frame shape having the first surface 23A, a second surface 23B, a third surface 23C, a fourth surface 23D, a fifth surface 23E, and a sixth surface 23F. The first surface 23A and the second surface 23B are opposite-side surfaces. The third surface 23C and the fourth surface 23D are opposite-side surfaces, and the fifth surface 23E and the sixth surface 23F are opposite-side surfaces.

As shown in FIG. 2, the frame 23 includes fixture attachment portions 231, a sensor attachment portion 232, and a terminal portion 233.

As shown in FIG. 2, the fixture attachment portions 231 are rod-shaped portions provided in a portion of the frame 23 on a third surface 23C side and a portion of the frame 23 on a fourth surface 23D side. End portions of the fixture 29 are attached to the fixture attachment portions 231.

The sensor attachment portion 232 is disposed between the third surface 23C and the fourth surface 23D. The detection unit 25 is attached to the sensor attachment portion 232.

The terminal portion 233 is provided substantially at a center of the sixth surface 23F. The cable 28 is coupled to the terminal portion 233, and the electric power is supplied from the coupling terminal 112 via the cable 28.

The detection unit 25 detects the vibration acting on the vibration reduction device 2. The detection unit 25 includes a printed circuit board 251 and a sensor (not shown) provided at the printed circuit board 251. The printed circuit board 251 is attached to the sensor attachment portion 232, and outputs a direction and an amplitude of the vibration detected by the sensor to the operation control unit 26. Examples of the sensor provided in the detection unit 25 include an acceleration sensor and a gyro sensor.

As shown in FIG. 3, the frame 23 further includes a disposition portion 234 and an attachment portion 235.

The disposition portion 234 and the attachment portion 235 are covered with the lid member 24 attached to the first surface 23A. In other words, the disposition portion 234 and the attachment portion 235 are exposed when the lid member 24 is removed from the frame 23.

The operation control unit 26 is disposed in the disposition portion 234.

The vibration generation device 3A is attached to the attachment portion 235.

The operation control unit 26 is a printed circuit board at which a plurality of circuit elements are mounted, and is disposed in the disposition portion 234. The operation control unit 26 controls operations of the vibration reduction device 2. Specifically, the operation control unit 26 operates the vibration generation device 3A based on a detection result obtained by the detection unit 25. Specifically, the operation control unit 26 supplies driving power to the vibration generation device 3A, and operates the vibration generation device 3A to generate the vibration opposite in phase from the vibration detected by the detection unit 25.

Configuration of Vibration Generation Device

Figure 4:
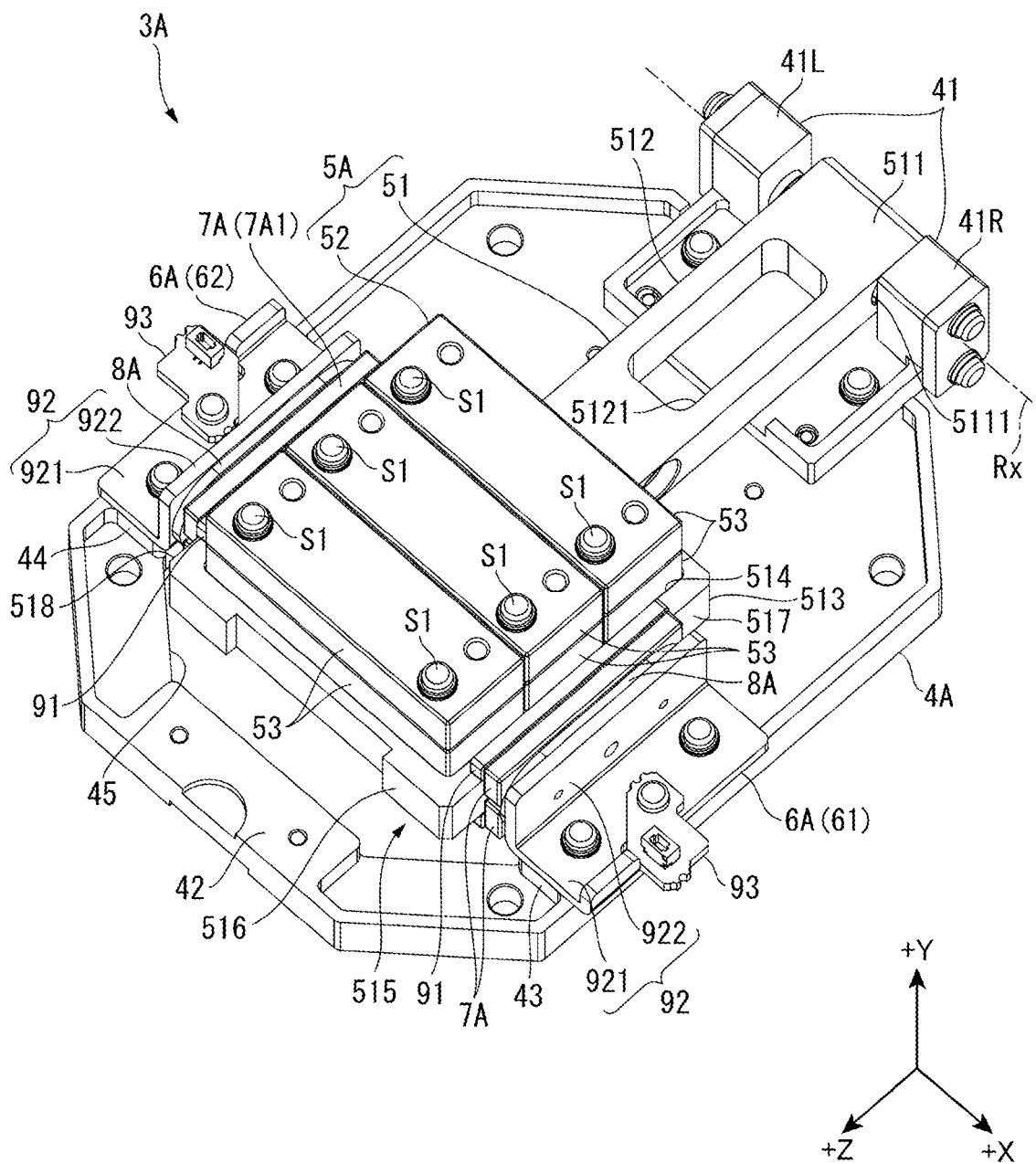
FIG. 4 is a perspective view showing a vibration generation device according to the first embodiment.
Figure 5:
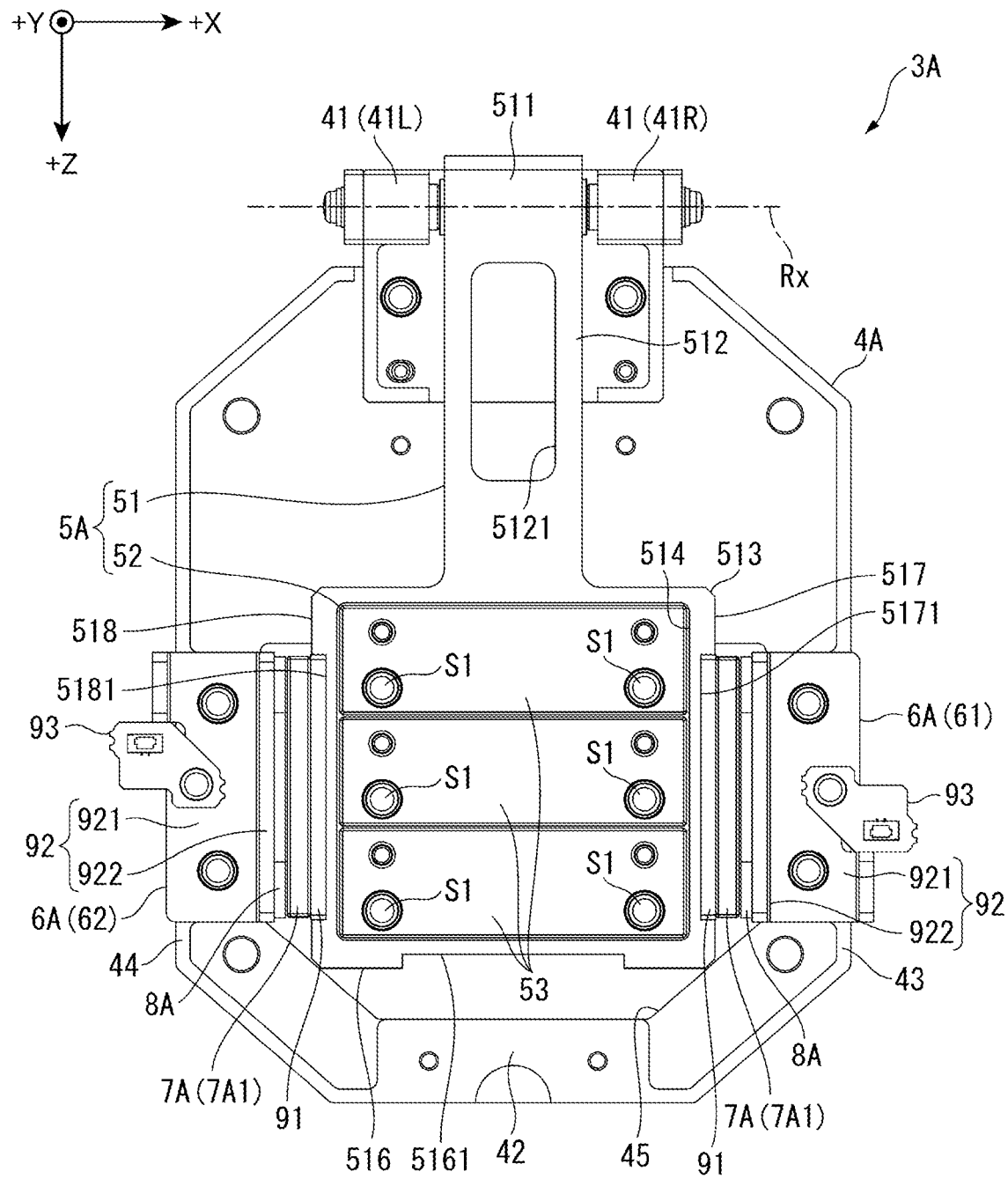
FIG. 5 is a plan view showing the vibration generation device according to the first embodiment.

FIG. 4 is a perspective view showing the vibration generation device 3A, and FIG. 5 is a plan view showing the vibration generation device 3A.

The vibration generation device 3A is attached to the attachment portion 235 provided in the frame 23. The vibration generation device 3A generates the vibration for reducing the vibration of the lens barrel 121, which is a vibration reduction object, under the control of the operation control unit 26. As shown in FIGS. 4 and 5, the vibration generation device 3A includes a base 4A, a pendulum 5A, and at least one driving unit 6A.

In the following description, three directions orthogonal to one another are defined as a +X direction, a +Y direction, and a +Z direction. The +X direction is a direction along a rotation axis Rx of the pendulum 5A, and is a direction from the third surface 23C toward the fourth surface 23D described above. The +Y direction is a direction perpendicular to the base 4A, and is a direction from the second surface 23B toward the first surface 23A described above.

The +Z direction is a direction in which the pendulum 5A extends from the rotation axis Rx when viewed from the +Y direction, and is a direction from the sixth surface 23F toward the fifth surface 23E described above. Further, although not shown, a direction opposite from the +X direction is defined as a −X direction, a direction opposite from the +Y direction is defined as the −Y direction, and a direction opposite from the +Z direction is defined as a −Z direction.

Configuration of Base

Figure 6:
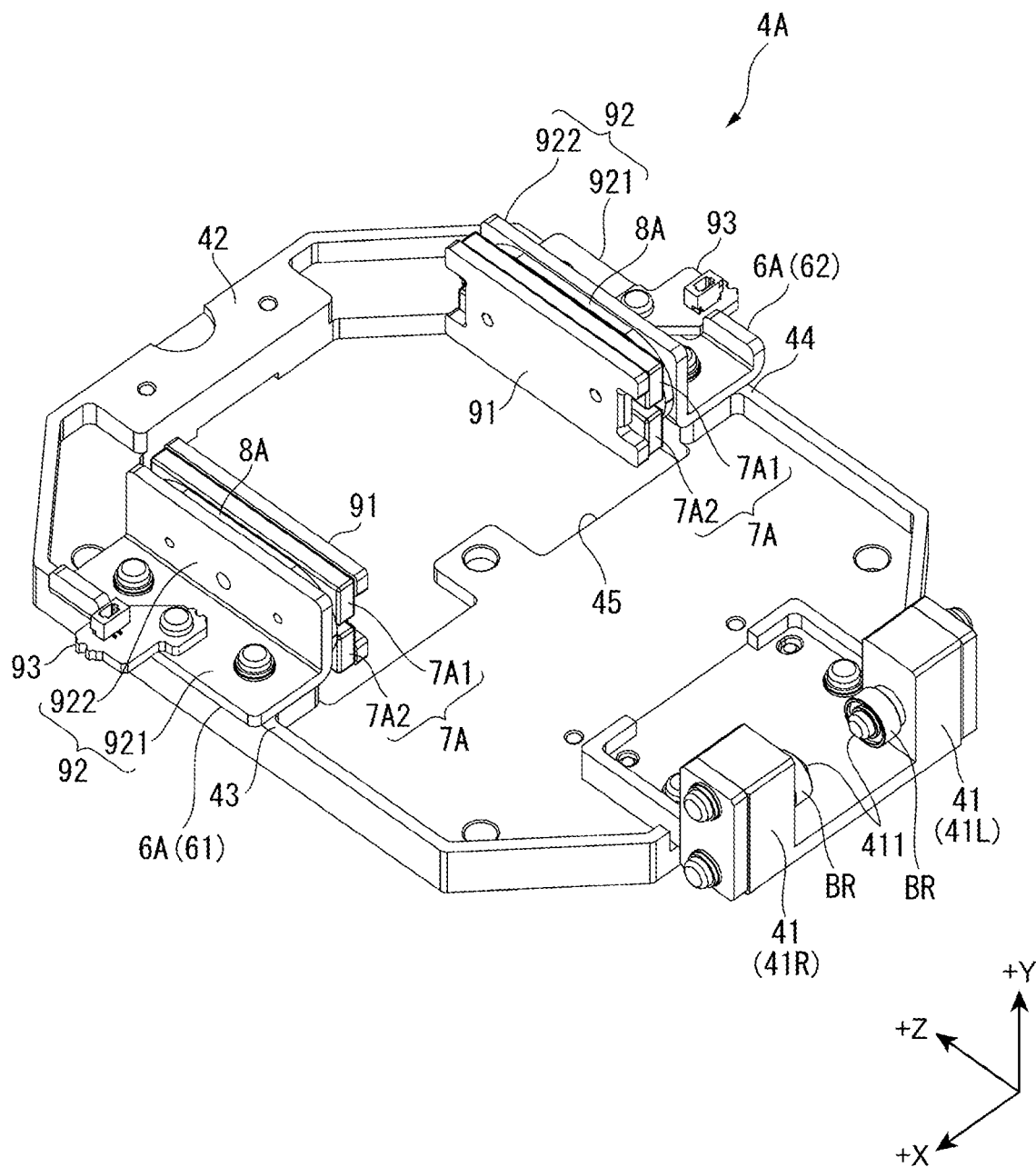
FIG. 6 is a perspective view showing the vibration generation device from which a pendulum is removed according to the first embodiment.

FIG. 6 is a perspective view showing the vibration generation device 3A in a state where the pendulum 5A is removed.

The base 4A is a plate-shaped member formed in a flat plate shape. The base 4A transmits the vibration generated by the vibration generation device 3A to an object in which the base 4A is provided, that is, the frame 23. The base 4A supports the pendulum 5A and the driving unit 6A, and is attached to the attachment portion 235 shown in FIG. 3. The base 4A includes a pair of support portions 41, fixing portions 42 to 44, and a relief portion 45.

The pair of support portions 41 rotatably support an end portion of the pendulum 5A in the −Z direction. The pair of support portions 41 are provided at positions sandwiching, in the +X direction, the end portion of the pendulum 5A in the −Z direction at an end portion of the base 4A in the −Z direction. As shown in FIG. 6, each of the pair of support portions 41 includes a pin 411 that forms the rotation axis Rx of the pendulum 5A. Of the pair of support portions 41, the pin 411 provided in a support portion 41L disposed in the −X direction protrudes from the support portion 41L in the +X direction, and the pin 411 provided in a support portion 41R disposed in the +X direction protrudes from the support portion 41R in the −X direction. The pins 411 are inserted into the pendulum 5A. Accordingly, the pendulum 5A is supported to be rotatable around the rotation axis Rx along the +X direction.

As shown in FIGS. 4 to 6, each of the fixing portions 42 to 44 is a portion of the base 4A to which a holding member 92 of the driving unit 6A can be fixed. The fixing portion 42 is provided at an end portion of the base 4A in the +Z direction. The fixing portion 43 is provided at an end portion of the base 4A in the +X direction, and the fixing portion 44 is provided at an end portion of the base 4A in the −X direction.

That is, the fixing portion 43 is a portion extending in the +Z direction, which is an extending direction of the pendulum 5A from the rotation axis Rx, from an end portion of the support portion 41 in the +X direction along the rotation axis Rx. The fixing portion 44 is a portion extending in the +Z direction, which is the extending direction of the pendulum 5A from the rotation axis Rx, from an end portion of the support portion 41 in the −X direction along the rotation axis Rx. The fixing portion 42 is a portion for coupling opposite-side end portions of the fixing portions 43 and 44 from the support portion 41.

The relief portion 45 is provided between the pair of support portions 41 and the fixing portion 42 in the +Z direction. Specifically, the relief portion 45 is provided in a portion surrounded by the pair of support portions 41 and the fixing portions 42 to 44. The relief portion 45 is a portion for preventing a portion of the pendulum 5A in the +Z direction and a magnet 7A to be described later from coming into contact with the base 4A when the pendulum 5A swings around the rotation axis Rx. In the embodiment, the relief portion 45 is an opening penetrating the base 4A along the +Y direction. However, the relief portion 45 is not limited thereto, and may be a recess that opens in a direction opposite from a direction facing the pendulum 5A. Specifically, the relief portion 45 may be a recess that opens in the +Y direction or the −Y direction. When the relief portion 45 is a recess, the relief portion 45 can also be configured such that the portion of the pendulum 5A in the +Z direction and the magnet 7A do not come into contact with the base 4A.

Configuration of Pendulum

Figure 7:
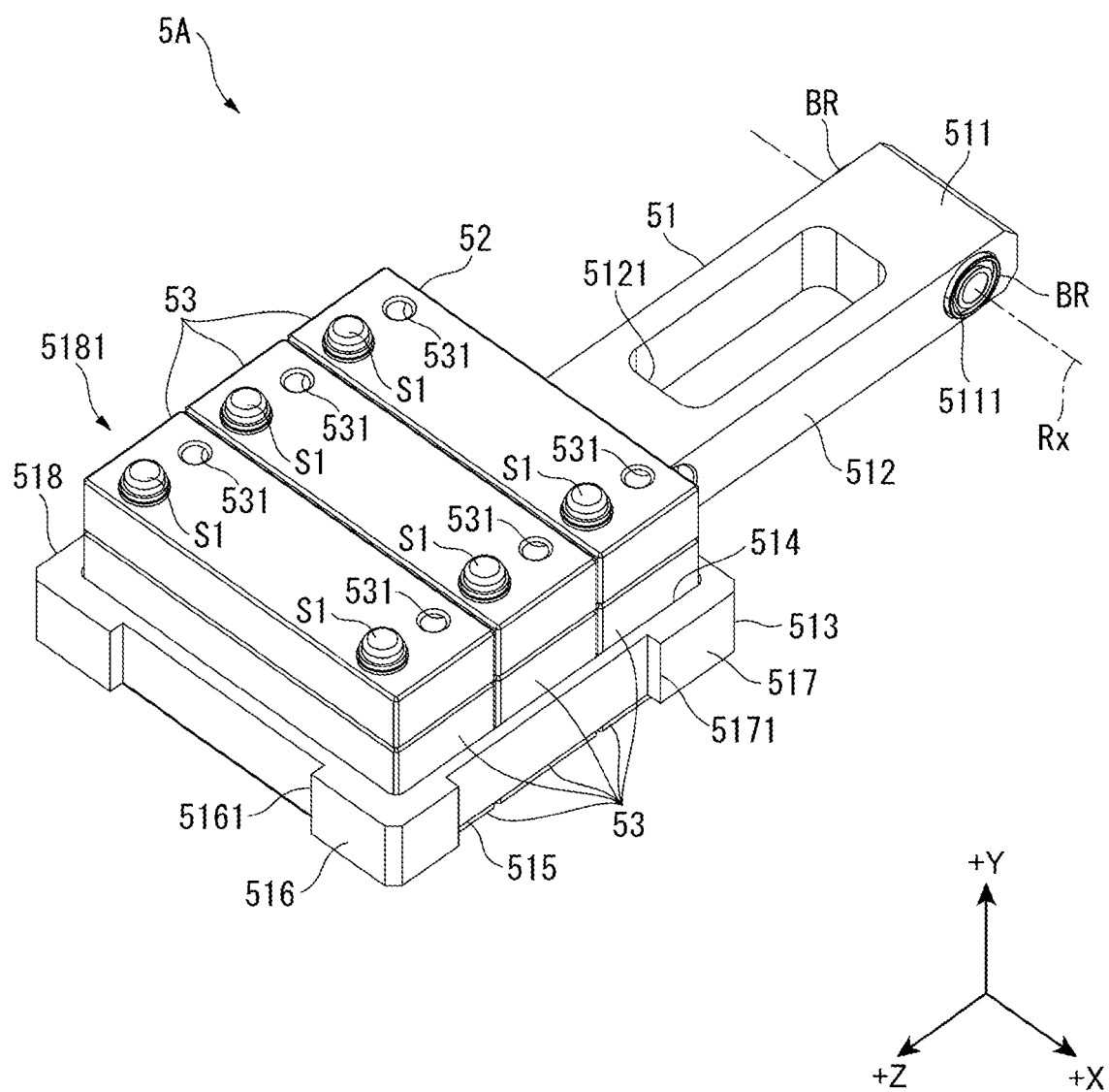
FIG. 7 is a perspective view showing the pendulum according to the first embodiment.
Figure 8:
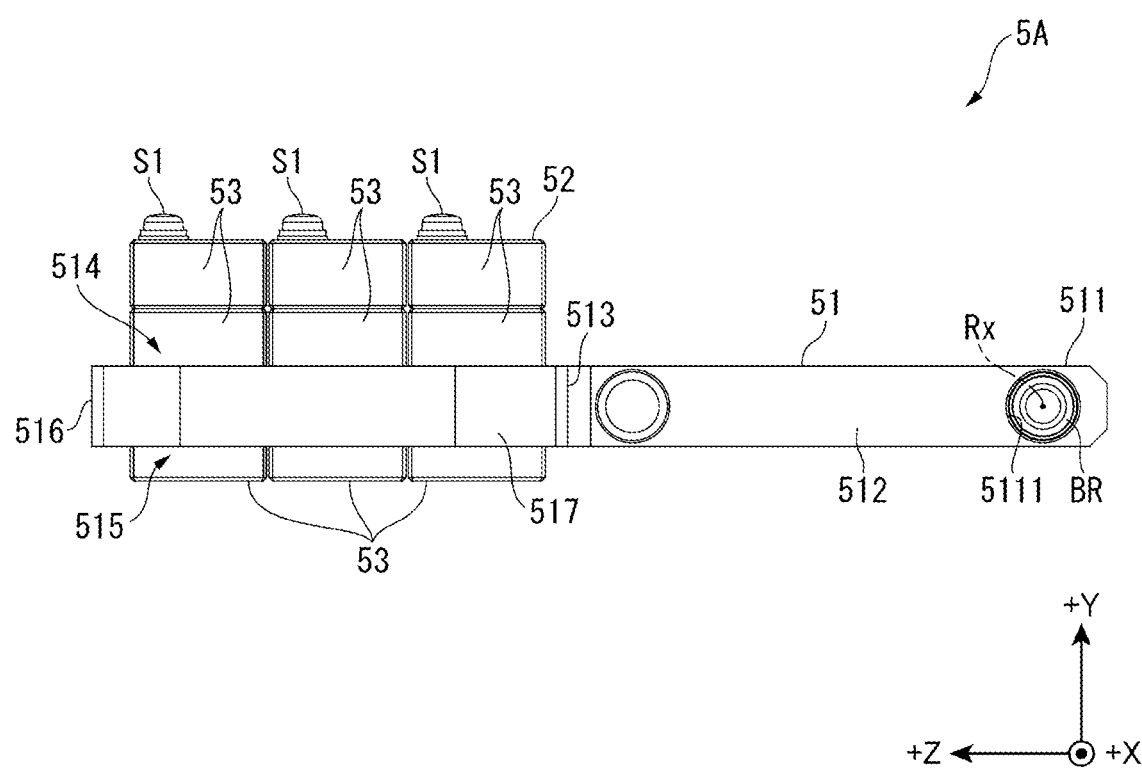
FIG. 8 is a side view showing the pendulum according to the first embodiment.

FIG. 7 is a perspective view showing the pendulum 5A. FIG. 8 is a side view of the pendulum 5A as viewed from the +X direction.

The pendulum 5A is swingably supported by the base 4A around the rotation axis Rx, and extends in the +Z direction from the rotation axis Rx. The pendulum 5A generates vibration by swinging around the rotation axis Rx by the driving unit 6A. As shown in FIGS. 7 and 8, the pendulum 5A includes an arm 51 and a weight portion 52.

As shown in FIG. 7, when viewed from the +Y direction, the arm 51 has a substantially T-shape in which an end portion of the arm 51 in the +Z direction is larger than an end portion thereof in the −Z direction. As shown in FIGS. 7 and 8, the arm 51 includes a coupling portion 511, an extending portion 512, an enlarged portion 513, disposition portions 514 and 515, a tip end portion 516, a first side surface portion 517, and a second side surface portion 518.

The coupling portion 511 is a portion of the arm 51 supported by the pair of support portions 41. In the embodiment, the coupling portion 511 is provided at an end portion of the arm 51 in the −Z direction. A hole portion 5111 is provided in each of a surface of the coupling portion 511 facing the +X direction and a surface of the coupling portion 511 facing the −X direction. A bearing BR shown in FIG. 6 is disposed inside each hole portion 5111. The pin 411 of each support portion 41 is inserted into the bearing BR via a washer (not shown), and thus the arm 51, hence, the pendulum 5A is supported by the pair of support portions 41.

The extending portion 512 is an extending portion from the coupling portion 511 to the enlarged portion 513. A dimension of the extending portion 512 along the +X direction is smaller than a dimension of the enlarged portion 513 along the +X direction, and the dimension of the extending portion 512 along the +X direction is the same in a range from the coupling portion 511 to the enlarged portion 513. The extending portion 512 is provided with a through hole 5121 to reduce a weight of the pendulum 5A and to make a position of a center of gravity of the pendulum 5A locate further toward the +Z direction. However, the through hole 5121 is not limited thereto. A recess may be provided instead of the through hole 5121, and the through hole 5121 may not be provided.

The enlarged portion 513 is a portion of the arm 51 in the +Z direction. The dimension of the enlarged portion 513 along the +X direction is larger than a dimension of the coupling portion 511 along the +X direction. The center of gravity of the pendulum 5A including the enlarged portion 513 is located closer to the +Z direction than is an intermediate position between the rotation axis Rx and an end portion of the pendulum 5A in the +Z direction. That is, regardless of a configuration and disposition of the weight portion 52, the center of gravity of the pendulum 5A is located closer to a tip end portion 516 side than is the intermediate position between the rotation axis Rx and the end portion of the pendulum 5A on the tip end portion 516 side.

The disposition portion 514 is provided at a surface of the enlarged portion 513 in the +Y direction, and the disposition portion 515 is provided at a surface of the enlarged portion 513 in the −Y direction. The disposition portion 514 is a recess recessed in the −Y direction from the surface of the enlarged portion 513 in the +Y direction, and is formed in a substantially square shape when viewed from the +Y direction. The disposition portion 515 is a recess recessed in the +Y direction from the surface of the enlarged portion 513 in the −Y direction, and is formed in a substantially square shape when viewed from the −Y direction. The weight portion 52 is disposed in at least one of the disposition portions 514 and 515. That is, the disposition portions 514 and 515 are provided at positions separated from the rotation axis Rx to the tip end portion 516 side, and are portions where the weight portions 52 can be disposed.

The weight portion 52 includes at least one weight portion member 53. That is, a weight and a position of a center of gravity of the weight portion 52 are adjusted according to the number and disposition of the weight portion members 53 constituting the weight portion 52.

The weight portion member 53 is formed in a substantially rectangular parallelepiped shape having a longitudinal axis along the +X direction, and is disposed along the +X direction in one of the disposition portions 514 and 515. The weight portion member 53 has through holes 531 penetrating the weight portion member 53 along the +Y direction. The weight portion member 53 is fixed to one of the disposition portions 514 and 515 by screws S1 inserted through the through holes 531.

In the disposition portion 514, three weight portion members 53 can be disposed along the +Z direction, and the weight portion members 53 can be further disposed in the +Y direction with respect to the weight portion members 53 disposed in the disposition portion 514. When a plurality of weight portion members 53 are disposed to overlap each other in the +Y direction, the plurality of weight portion members 53 are fixed to the disposition portion 514 in a state where the screws S1 are inserted through the through holes 531 of each weight portion member 53. The same applies to the disposition portion 515. With such a configuration, the number and the disposition of the weight portion members 53 provided in the pendulum 5A can be adjusted.

The tip end portion 516 is an end portion on an opposite side of a center of the pendulum 5A extending from the rotation axis Rx from the rotation axis Rx in the +Z direction, which is the extending direction of the pendulum 5A, among directions intersecting with the rotation axis Rx. That is, the tip end portion 516 is an end portion of the arm 51 facing the +Z direction and is a free end of the arm 51.

The tip end portion 516 includes an attachment portion 5161 recessed in the −Z direction. A plate member similar to a plate member 91 of the driving unit 6A can be attached to the attachment portion 5161. A case where the plate member 91 is attached to the attachment portion 5161 will be described in detail in a second embodiment.

The first side surface portion 517 and the second side surface portion 518 intersect with the +X direction, which is a direction parallel to the rotation axis Rx, and are opposite-side end portions. Specifically, the first side surface portion 517 is a side surface portion of the enlarged portion 513 facing the +X direction, and the second side surface portion 518 is a side surface portion of the enlarged portion 513 facing the −X direction.

The first side surface portion 517 includes an attachment portion 5171 recessed in the −X direction. The plate member 91 of a first driving unit 61 is attached to the attachment portion 5171.

The second side surface portion 518 includes an attachment portion 5181 recessed in the +X direction. The plate member 91 of a second driving unit 62 is attached to the attachment portion 5181.

Configuration of Driving Unit

Figure 9:
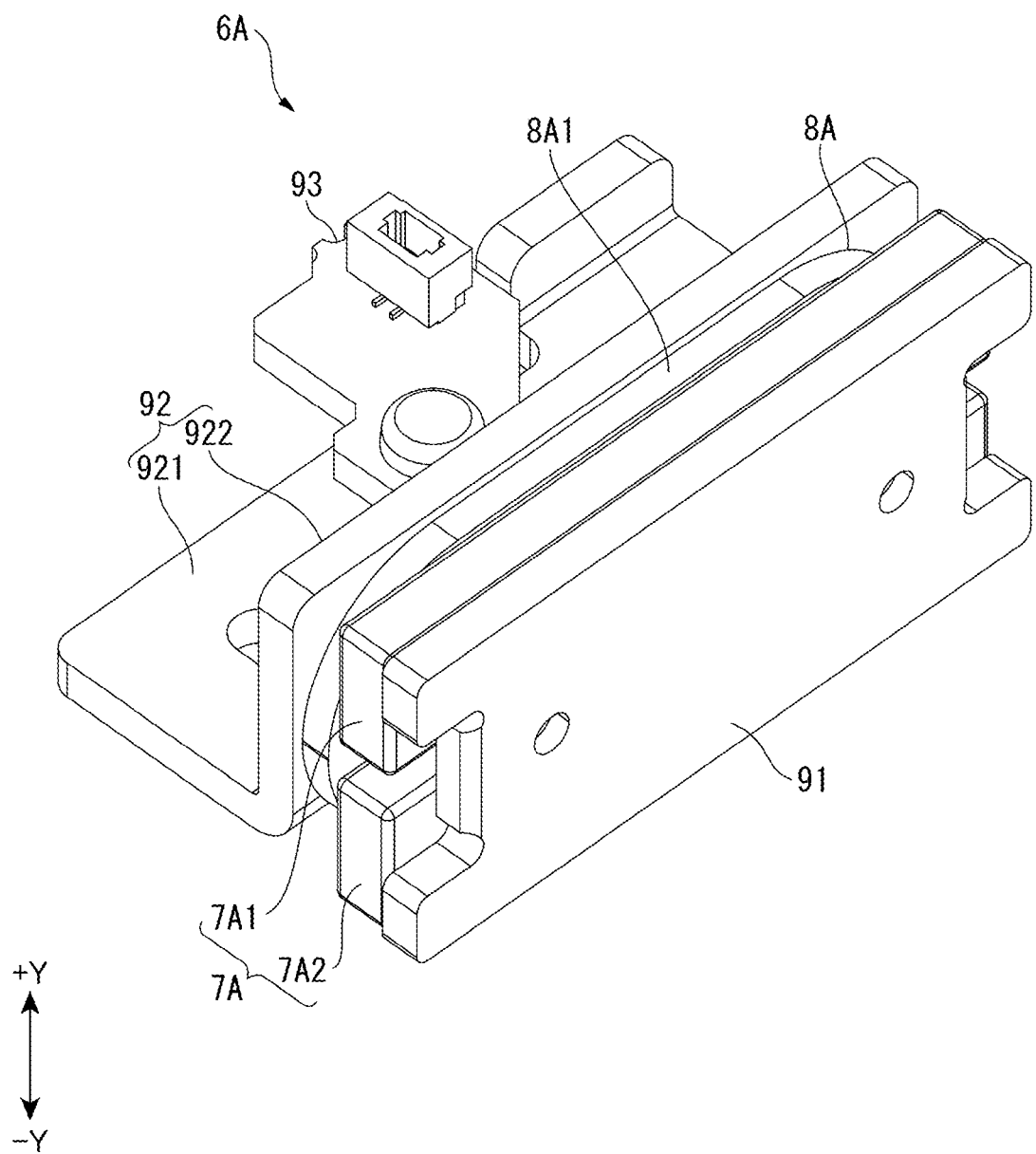
FIG. 9 is a perspective view showing a driving unit according to the first embodiment.
Figure 10:
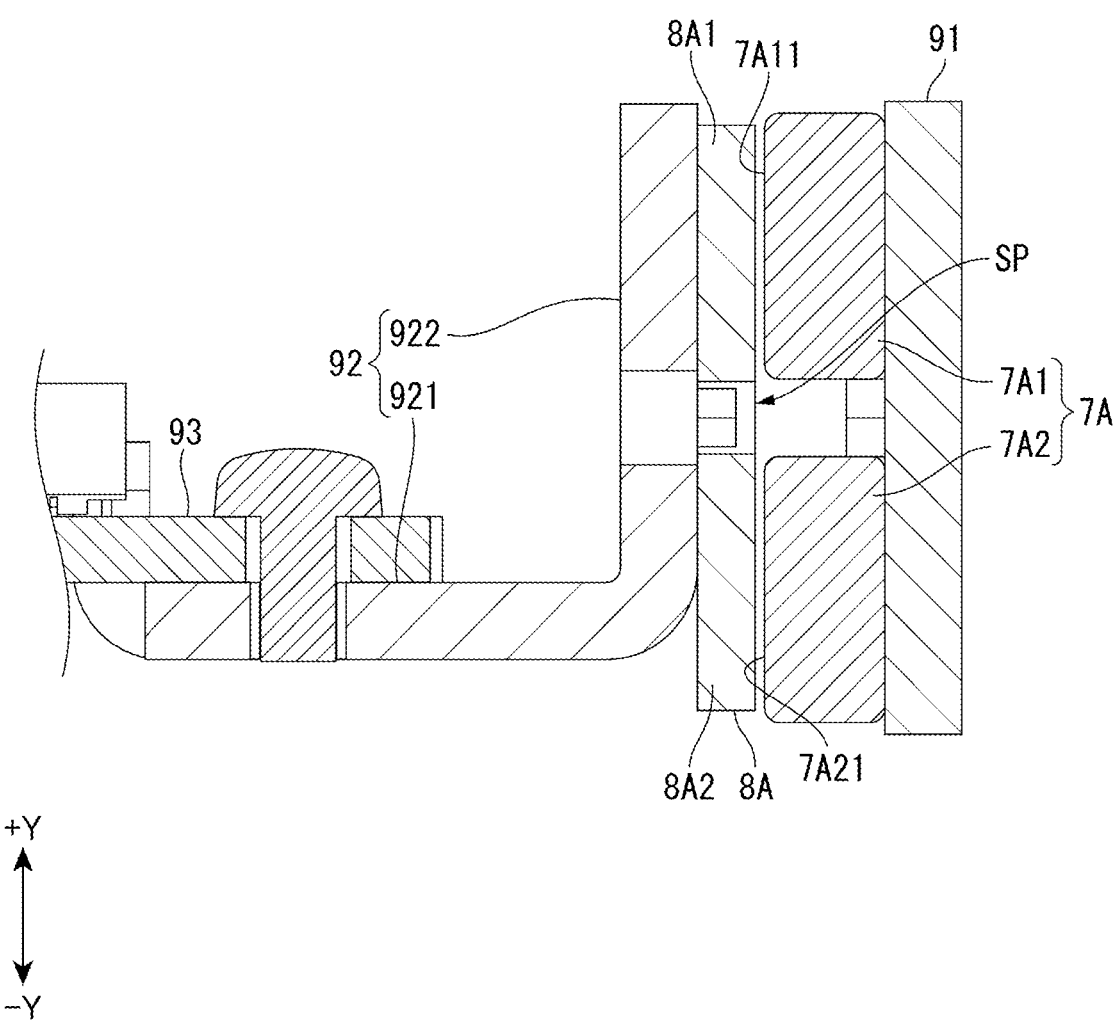
FIG. 10 is a cross-sectional view showing the driving unit according to the first embodiment.

FIG. 9 is a perspective view showing the driving unit 6A, and FIG. 10 is a cross-sectional view showing the driving unit 6A.

The driving unit 6A swings the pendulum 5A supported by the base 4A around the rotation axis Rx. At least one driving unit 6A is provided in the vibration generation device 3A. In other words, the vibration generation device 3A includes at least one driving unit 6A.

As shown in FIGS. 9 and 10, the driving unit 6A includes the magnet 7A, a coil 8A, the plate member 91, the holding member 92, and a terminal portion 93. The driving unit 6A further includes a control unit (not shown).

Configuration of Magnet

The magnet 7A is provided at a position separated from the rotation axis Rx at the pendulum 5A by the plate member 91. The magnet 7A is attracted or repelled with respect to a magnetic force generated in the coil 8A, thereby swinging the pendulum 5A around the rotation axis Rx. The magnet 7A includes a first magnet member 7A1 and a second magnet member 7A2.

Each of the first magnet member 7A1 and the second magnet member 7A2 is formed in a substantially rectangular parallelepiped shape having a longitudinal axis. A dimension of the first magnet member 7A1 along the longitudinal axis and a dimension of the second magnet member 7A2 along the longitudinal axis substantially coincide with a dimension of the coil 8A along the same direction.

As shown in FIG. 10, a surface 7A11 of the first magnet member 7A1 facing the coil 8A faces a first extending portion 8A1 of the coil 8A, which will be described later. A magnetic pole of the surface 7A11 is an S pole in the embodiment.

The second magnet member 7A2 is disposed to be separated from the first magnet member 7A1 in the −Y direction. Specifically, the second magnet member 7A2 is separated from the first magnet member 7A1 in the −Y direction from the first extending portion 8A1 toward a to-be-described second extending portion 8A2 in the coil 8A. As shown in FIG. 10, a surface 7A21 of the second magnet member 7A2 facing the coil 8A faces the second extending portion 8A2 of the coil 8A. A magnetic pole of the surface 7A21 is an N pole in the embodiment. That is, the magnetic pole of the surface 7A11 of the first magnet member 7A1 facing the first extending portion 8A1 is different from the magnetic pole of the surface 7A21 of the second magnet member 7A2 facing the second extending portion 8A2.

Configuration of Plate Member

The plate member 91 is formed in a flat plate shape. The plate member 91 supports the magnet 7A and is attached to the arm 51 of the pendulum 5A. Accordingly, the magnet 7A is attached to the pendulum 5A. The plate member 91 functions as a yoke for the magnet 7A. That is, the plate member 91 is a magnet-side yoke provided at an opposite-side position of the magnet 7A from the coil 8A.

Configuration of Coil

Figure 11:
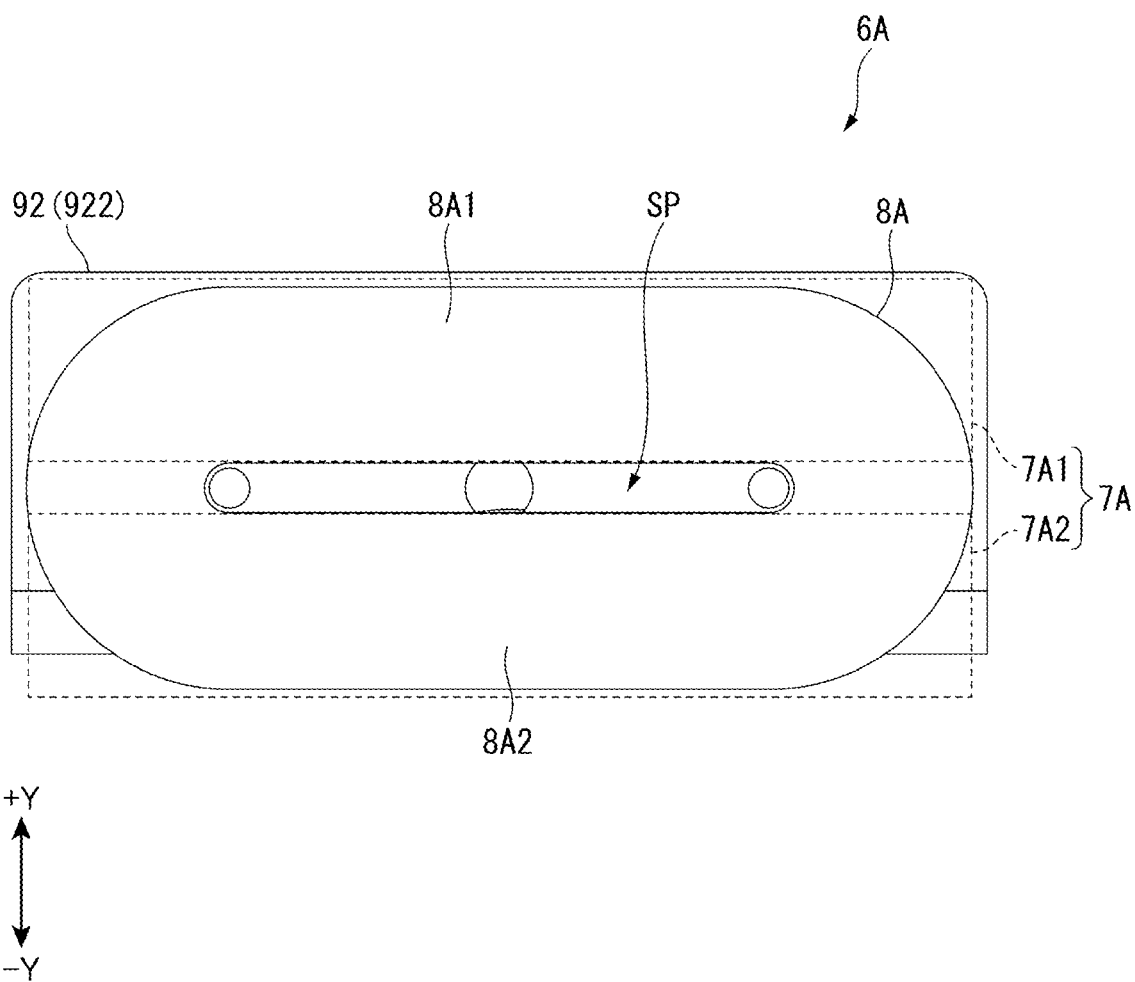
FIG. 11 is a view showing a coil constituting the driving unit according to the first embodiment.

FIG. 11 is a view showing the coil 8A constituting the driving unit 6A.

The coil 8A is provided at a configuration other than the pendulum 5A. In the embodiment, the coil 8A is fixed to the base 4A by the holding member 92. The coil 8A is disposed to face the magnet 7A in a non-contact manner, and generates a magnetic field acting on the magnet 7A.

As shown in FIG. 11, the coil 8A is an air-core coil formed by winding a conductive wire in a planar manner in a track shape or an oval shape having a longitudinal axis when viewed from the magnet 7A. Therefore, when viewed from the magnet 7A, a dimension of the coil 8A along the longitudinal axis is larger than a dimension of the coil 8A along a transverse axis orthogonal to the longitudinal axis.

The coil 8A includes the first extending portion 8A1 and the second extending portion 8A2.

The first extending portion 8A1 is a portion linearly extending along the longitudinal axis of the coil 8A. The first extending portion 8A1 is disposed in the +Y direction with respect to an air-core portion SP of the coil 8A.

The second extending portion 8A2 is disposed on a side opposite from the first extending portion 8A1 with the air-core portion SP of the coil 8A sandwiched therebetween. That is, the second extending portion 8A2 is disposed in the −Y direction with respect to the first extending portion 8A1. The second extending portion 8A2 linearly extends along the longitudinal axis of the coil 8A. A dimension of the second extending portion 8A2 along the longitudinal axis of the coil 8A is substantially the same as a dimension of the first extending portion 8A1 along the longitudinal axis of the coil 8A. When the control unit causes a current to flow through the coil 8A, a direction of the current in the second extending portion 8A2 is opposite from a direction of the current in the first extending portion 8A1.

In the embodiment, the coil 8A is the air-core coil having no core as described above, and may be a coil having a core between the first extending portion 8A1 and the second extending portion 8A2.

Configuration of Holding Member

The holding member 92 is fixed to one of the fixing portions 42 to 44 in a state of holding the coil 8A and the terminal portion 93. The holding member 92 includes a first plate-shaped portion 921 orthogonal to the +Y direction and a second plate-shaped portion 922 standing from the first plate-shaped portion 921 in the +Y direction. The holding member 92 is made of a ferromagnetic material, and is formed in a substantially L shape when viewed from a lateral side.

A surface of the first plate-shaped portion 921 in the −Y direction is in contact with one of the fixing portions 42 to 44. The terminal portion 93 is attached to the surface of the first plate-shaped portion 921 in the +Y direction.

The coil 8A is attached to a surface of the second plate-shaped portion 922 in a direction opposite from a direction in which the first plate-shaped portion 921 extends from the second plate-shaped portion 922. Specifically, the coil 8A is attached to a surface of the second plate-shaped portion 922 facing the magnet 7A. Since the holding member 92 is formed of the ferromagnetic material, the second plate-shaped portion 922 functions as a yoke that controls a direction of the magnetic field generated by the coil 8A. That is, the vibration generation device 3A includes the holding member 92 including the second plate-shaped portion 922 which is a coil-side yoke disposed at an opposite side of the coil 8A from the magnet 7A, and the holding member 92 is a ferromagnetic holding member that holds the coil 8A.

Configuration of Terminal Portion

The terminal portion 93 is electrically coupled to the operation control unit 26 of the vibration reduction device 2, and supplies a current supplied from the operation control unit 26 to the control unit (not shown). The control unit causes the coil 8A to generate the magnetic field by energizing the coil 8A, thereby applying a driving force to the pendulum 5A including the magnet 7A to swing the pendulum 5A. Specifically, the control unit causes an AC current to flow through the coil 8A to alternately reverse the direction of the magnetic field generated by the coil 8A, thereby swinging the pendulum 5A around the rotation axis Rx. That is, the control unit alternately switches a direction of the current flowing through the coil 8A.

When the AC current flows through the coil 8A, a magnetic field is generated from one of the first extending portion 8A1 and the second extending portion 8A2 toward the other extending portion. That is, one of the extending portions is an N pole, and the other extending portion is an S pole. The control unit causes an AC current of a predetermined frequency to flow through the coil 8A, thereby alternately switching the magnetic pole of the first extending portion 8A1 and the magnetic pole of the second extending portion 8A2.

As described above, the magnetic pole of the surface 7A11 of the first magnet member 7A1 facing the first extending portion 8A1 in a non-contact manner is different from the magnetic pole of the surface 7A21 of the second magnet member 7A2 facing the second extending portion 8A2 in a non-contact manner.

Therefore, when the AC current flows through the coil 8A, the pendulum 5A to which the magnet 7A is attached by the plate member 91 swings around the rotation axis Rx according to a frequency of the AC current. The frequency of the AC current flowing through the coil 8A is set by the operation control unit 26 according to the vibration detected by the detection unit 25 provided in the vibration reduction device 2. Accordingly, the vibration generation device 3A can generate the vibration opposite in phase from the vibration propagated to the projection optical device 12, and therefore the vibration of the projection optical device 12 can be reduced.

Specific Disposition of Configurations of First Driving Unit and Second Driving Unit As described above, the vibration generation device 3A includes at least one driving unit 6A. In the embodiment, the vibration generation device 3A includes a plurality of driving units 6A, and the plurality of driving units 6A include the first driving unit 61 and the second driving unit 62.

In other words, each of the first driving unit 61 and the second driving unit 62 is one of the plurality of driving units 6A provided in the vibration generation device 3A. The first driving unit 61 is provided in the +X direction with respect to the pendulum 5A, and the second driving unit 62 is provided in the −X direction with respect to the pendulum 5A.

Specifically, the first driving unit 61 includes the magnet 7A, the coil 8A, the plate member 91, the holding member 92, and the terminal portion 93, and further includes a control unit (not shown). The magnet 7A of the first driving unit 61 corresponds to a first magnet, and the coil 8A of the first driving unit 61 corresponds to a first coil.

In the first driving unit 61, the plate member 91 is attached to the attachment portion 5171 provided at the first side surface portion 517 of the arm 51.

The first magnet member 7A1 and the second magnet member 7A2 constituting the magnet 7A are fixed to a surface of the plate member 91 in the +X direction such that the longitudinal axis of each of the magnet members 7A1 and 7A2 is along the +Z direction. That is, the magnet 7A of the first driving unit 61 is provided at the first side surface portion 517 to be separated from the rotation axis Rx.

The first plate-shaped portion 921 of the holding member 92 is fixed to the fixing portion 43 of the base 4A.

The coil 8A is attached to a surface of the second plate-shaped portion 922 of the holding member 92 facing the magnet 7A in the −X direction to face the magnet 7A in a non-contact manner. Specifically, the coil 8A is disposed such that the first extending portion 8A1 faces the first magnet member 7A1 in the +X direction in a non-contact manner and the second extending portion 8A2 faces the second magnet member 7A2 in the +X direction in a non-contact manner.

As described above, a magnetic pole of a surface of the first magnet member 7A1 facing the first extending portion 8A1 is different from a magnetic pole of a surface of the second magnet member 7A2 facing the second extending portion 8A2.

The second driving unit 62 includes the magnet 7A, the coil 8A, the plate member 91, the holding member 92, and the terminal portion 93, and further includes a control unit (not shown). The magnet 7A of the second driving unit 62 corresponds to a second magnet, and the coil 8A of the second driving unit 62 corresponds to a second coil.

In the second driving unit 62, the plate member 91 is attached to the attachment portion 5181 provided at the second side surface portion 518 of the arm 51.

The first magnet member 7A1 and the second magnet member 7A2 constituting the magnet 7A are fixed to a surface of the plate member 91 in the −X direction such that the longitudinal axis of each of the magnet members 7A1 and 7A2 is along the +Z direction. That is, the magnet 7A of the second driving unit 62 is provided at the second side surface portion 518 to be separated from the rotation axis Rx.

The first plate-shaped portion 921 of the holding member 92 is fixed to the fixing portion 44 of the base 4A.

The coil 8A is attached to a surface of the second plate-shaped portion 922 of the holding member 92 facing the magnet 7A in the +X direction to face the magnet 7A in a non-contact manner. Specifically, the coil 8A is disposed such that the first extending portion 8A1 faces the first magnet member 7A1 in the +X direction in a non-contact manner and the second extending portion 8A2 faces the second magnet member 7A2 in the +X direction in a non-contact manner.

As described above, a magnetic pole of a surface of the first magnet member 7A1 facing the first extending portion 8A1 is different from a magnetic pole of a surface of the second magnet member 7A2 facing the second extending portion 8A2.

Synchronization of First Driving Unit and Second Driving Unit

The control unit of the first driving unit 61 causes the coil 8A to generate a magnetic field by causing an AC current to flow through the coil 8A of the first driving unit 61. The control unit of the second driving unit 62 causes the coil 8A to generate a magnetic field by causing an AC current to flow through the coil 8A of the second driving unit 62. At this time, the control units cause the AC currents of the same frequency and the same phase to flowing through the coils 8A such that the first extending portion 8A1 of the coil 8A of the first driving unit 61 and the first extending portion 8A1 of the coil 8A of the second driving unit 62 have the same magnetic pole, and the second extending portion 8A2 of the coil 8A of the first driving unit 61 and the second extending portion 8A2 of the coil 8A of the second driving unit 62 have the same magnetic pole.

Accordingly, one of the first driving unit 61 and the second driving unit 62 can be prevented from interfering with the swing of the pendulum 5A generated by the other driving unit. In addition, since the pendulum 5A can be swung by the driving force of each of the driving units 61 and 62, a rotational torque when the pendulum 5A swings can be increased. The driving units 61 and 62 may share a single control unit.

Effects of First Embodiment

The projector 1 according to the embodiment described above has the following effects.

The projector 1 corresponds to the electronic apparatus. The projector 1 includes the vibration reduction device 2. The vibration reduction device 2 includes the vibration generation device 3A, the detection unit 25, and the operation control unit 26.

The detection unit 25 detects the vibration of the projection optical device 12 which is an object. The operation control unit 26 causes the vibration generation device 3A to generate vibration opposite in phase from the vibration detected by the detection unit 25.

The vibration generation device 3A includes the base 4A, the pendulum 5A, and at least one driving unit 6A. The base 4A transmits the vibration generated by the swing of the pendulum 5A to the frame 23 which is the object. The pendulum 5A is provided at the base 4A swingably around the rotation axis Rx.

The pendulum 5A includes the tip end portion 516, the first side surface portion 517, and the second side surface portion 518. The tip end portion 516 is the end portion on the opposite side of the center of the pendulum 5A extending from the rotation axis Rx from the rotation axis Rx in the +Z direction, which is the extending direction in which the pendulum 5A extends, among the directions intersecting with the rotation axis Rx. The first side surface portion 517 and the second side surface portion 518 intersect with the direction parallel to the rotation axis Rx, and are the opposite-side end portions.

The at least one driving unit 6A includes the magnet 7A provided at the pendulum 5A and the coil 8A provided at a configuration other than the pendulum 5A and disposed to face the magnet 7A in a non-contact manner, and applies the driving force to the pendulum 5A. The driving unit 6A includes the first driving unit 61. The first driving unit 61 includes the magnet 7A as the first magnet and the coil 8A as the first coil. In the first driving unit 61, the magnet 7A is provided at the first side surface portion 517 to be separated from the rotation axis Rx, and the coil 8A is disposed to face the magnet 7A in a non-contact manner.

According to such a configuration, the magnet 7A facing the coil 8A in a non-contact manner and acting on the magnetic force generated in the coil 8A is provided in the pendulum 5A. Accordingly, there is no need to provide, in the pendulum 5A supported by the base 4A swingably around the rotation axis Rx, a wiring for supplying the current. Therefore, when the pendulum 5A swings, a damage to the wiring for supplying the current to the coil 8A can be prevented, and the pendulum 5A can be reliably swung. Therefore, reliability of the vibration generation device 3A can be improved. Further, since the vibration generation device 3A can stably generate vibration, the vibration opposite in phase from the vibration detected by the detection unit 25 can be generated. Therefore, the vibration of the projector 1 can be reduced.

The at least one driving unit 6A provided in the vibration generation device 3A includes the second driving unit 62. The second driving unit 62 includes the magnet 7A as the second magnet and the coil 8A as the second coil. In the second driving unit 62, the magnet 7A is provided at the second side surface portion 518 to be separated from the rotation axis Rx, and the coil 8A is disposed to face the magnet 7A in a non-contact manner.

According to such a configuration, the vibration generation device 3A includes the first driving unit 61 and the second driving unit 62, and the pendulum 5A is swung around the rotation axis Rx by the first driving unit 61 and the second driving unit 62. At this time, the magnet 7A provided in the first driving unit 61 is provided at the first side surface portion 517 of the pendulum 5A, and the magnet 7A provided in the second driving unit 62 is provided at the second side surface portion 518 located at an opposite side of the pendulum 5A from the first side surface portion. That is, the first driving unit 61 and the second driving unit 62 are provided with the pendulum 5A sandwiched therebetween in the direction along the rotation axis Rx. Accordingly, the pendulum 5A can be stably swung.

In addition, since the pendulum 5A can be swung by the plurality of driving units 61 and 62, the swing of the pendulum 5A can be increased, and a torque when the pendulum 5A swings can be increased. Therefore, the vibration generated by the vibration generation device 3A can be increased.

The vibration generation device 3A includes the control unit that alternately switches the directions of currents flowing through the plurality of coils 8A in synchronization with each other. That is, the control unit of the first driving unit 61 and the control unit of the second driving unit 62 alternately switch the direction of the current flowing through the coil 8A of the first driving unit 61 and the direction of the current flowing through the coil 8A of the second driving unit 62 in synchronization with each other. In other words, the AC currents flow through the coil 8A of the first driving unit 61 and the coil 8A of the second driving unit 62.

According to such a configuration, the direction of the magnetic force generated in each coil 8A can be alternately reversed. In addition, the magnetic force generated in the coil 8A of the second driving unit 62 can be prevented from interfering with the swing of the pendulum 5A with respect to the magnetic force generated in the coil 8A of the first driving unit 61.

Therefore, the pendulum 5A can be stably swung by the magnetic force generated in the coil 8A of the first driving unit 61 and the magnetic force generated in the coil 8A of the second driving unit 62, and the torque when the pendulum 5A swings can be increased.

In the vibration generation device 3A, the coil 8A is attached to the base 4A.

According to such a configuration, the coil 8A can be stably disposed at a position facing the magnet 7A in a non-contact manner.

The vibration generation device 3A includes the plate member 91 and the holding member 92. The plate member 91 corresponds to the magnet-side yoke, and is provided at an opposite-side position of the magnet 7A from the coil 8A. The holding member 92 corresponds to the coil-side yoke, and is provided at an opposite-side position of the coil 8A from the magnet 7A.

According to such a configuration, an attraction force of the magnet 7A can be increased by the plate member 91 serving as the magnet-side yoke, and the magnetic force generated in the coil 8A can be directed toward the magnet 7A by the holding member 92 serving as the coil-side yoke. Therefore, since interaction between the magnetic force generated in the coil 8A and the magnet 7A provided in the pendulum 5A can be strengthened, the current flowing through the coil 8A for swinging the pendulum 5A can be reduced.

In the vibration generation device 3A, the holding member 92, which is the coil-side yoke, is a ferromagnetic holding member that holds the coil 8A.

According to such a configuration, since the coil 8A is held by the holding member 92, there is no need to separately provide a member for holding the coil 8A and the coil-side yoke. Therefore, an increase in the number of components of the vibration generation device 3A can be prevented.

In the vibration generation device 3A, the coil 8A is an air-core coil having a longitudinal axis. The magnet 7A is disposed along the longitudinal axis of the coil 8A, and faces the coil 8A in a non-contact manner.

According to such a configuration, a cost of the coil 8A can be reduced as compared with a coil having a core, and therefore a manufacturing cost of the vibration generation device 3A can be reduced.

In addition, since the magnet 7A is disposed along the longitudinal axis of the coil 8A, a surface of the magnet 7A acting on the magnetic force generated in the coil 8A can be easily enlarged, and interaction between the coil 8A and the magnet 7A can be enhanced.

In the vibration generation device 3A, the coil 8A includes a first extending portion 8A1 extending along the longitudinal axis, and a second extending portion 8A2 extending along the longitudinal axis and through which a current flows in a direction opposite from that of the first extending portion 8A1. In the magnet 7A, the magnetic pole of the surface 7A11 facing the first extending portion 8A1 is different from the magnetic pole of the surface 7A21 facing the second extending portion 8A2.

According to such a configuration, the direction of the magnetic force generated in the coil 8A is alternately changed, and therefore the pendulum 5A to which the magnet 7A is fixed can be reliably swung.

In the vibration generation device 3A, the center of gravity of the pendulum 5A is located closer to the tip end portion 516 side than is a middle of a distance from the rotation axis Rx to the tip end portion 516.

According to such a configuration, the rotational torque generated when the pendulum 5A swings can be increased. Therefore, the vibration generated by the vibration generation device 3A can be increased.

In the vibration generation device 3A, the pendulum 5A includes the disposition portions 514 and 515, at which the weight portions 52 can be disposed, at positions separated from the rotation axis Rx to the tip end portion 516 side.

According to such a configuration, since the weight and the position of the center of gravity of the pendulum can be adjusted by adjusting the weight and the disposition of the weight portion provided in the disposition portion, the rotational torque generated when the pendulum swings can be increased. Therefore, an amplitude of the vibration generated by the vibration generation device can be adjusted.

In the vibration generation device 3A, the base 4A includes the relief portion 45 that avoids contact with the pendulum 5A.

According to such a configuration, noise due to the contact of the pendulum 5A with the base 4A can be prevented from occurring when the pendulum 5A swings, and a stroke when the pendulum 5A swings can be increased.

First Modification of First Embodiment

In the vibration generation device 3A described above, the magnet 7A includes the first magnet member 7A1 and the second magnet member 7A2 separated from each other in the −Y direction from the first extending portion 8A1 toward the second extending portion 8A2. However, a magnet provided in the pendulum 5A is not limited thereto, and may be one magnet facing the first extending portion 8A1 and the second extending portion 8A2.

Figure 12:
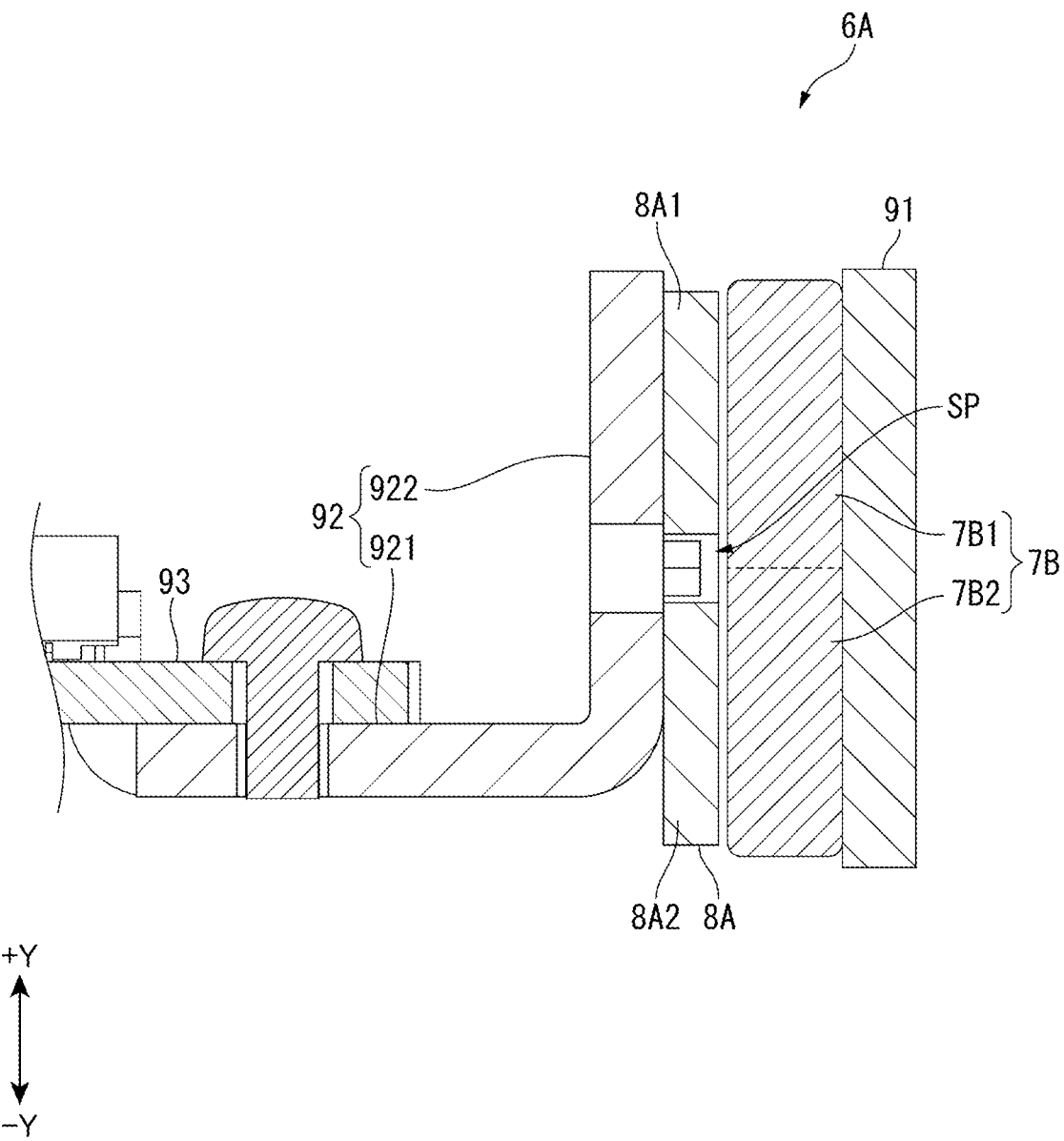
FIG. 12 is a view showing a driving unit according to a first modification of the first embodiment.

FIG. 12 is a cross-sectional view showing a first modification of the driving unit 6A. Specifically, FIG. 12 is a cross-sectional view showing a magnet 7B that is a deformation of the magnet 7A provided in the driving unit 6A.

For example, the driving unit 6A used in the vibration generation device 3A may use the magnet 7B shown in FIG. 12 instead of the magnet 7A. That is, at least one of the first driving unit 61 and the second driving unit 62 may include the magnet 7B instead of the magnet 7A.

Unlike the magnet 7A including the first magnet member 7A1 and the second magnet member 7A2, the magnet 7B is formed by a single magnet member.

The magnet 7B is formed in a rectangular parallelepiped shape having a longitudinal axis substantially parallel to the longitudinal axis of the coil 8A, and is fixed to the plate member 91 to face the coil 8A in a non-contact manner. A dimension of the magnet 7B along the longitudinal axis is substantially the same as a dimension of the coil 8A along the longitudinal axis, and a dimension of the magnet 7B along the +Y direction orthogonal to the longitudinal axis is substantially the same as a dimension of the coil 8A along the +Y direction.

The magnet 7B includes a portion 7B1 facing the first extending portion 8A1 of the coil 8A and a portion 7B2 facing the second extending portion 8A2 of the coil 8A, and the portion 7B1 and the portion 7B2 are coupled to each other. A magnetic pole of a surface of the portion 7B1 facing the first extending portion 8A1 is different from a magnetic pole of a surface of the portion 7B2 facing the second extending portion 8A2. For example, the magnetic pole of the surface of the portion 7B1 facing the first extending portion 8A1 is an S pole, and the magnetic pole of the surface of the portion 7B2 facing the second extending portion 8A2 is an N pole.

The vibration generation device 3A including the driving unit 6A in which such a magnet 7B is used can also achieve the same effects as those described above.

Second Modification of First Embodiment

In the vibration generation device 3A described above, the driving unit 6A including the first driving unit 61 and the second driving unit 62 includes the magnet 7A and the coil 8A. That is, the driving unit 6A includes the coil 8A implemented by one air-core coil. However, the driving unit is not limited thereto, and may include a plurality of coils.

Figure 13:
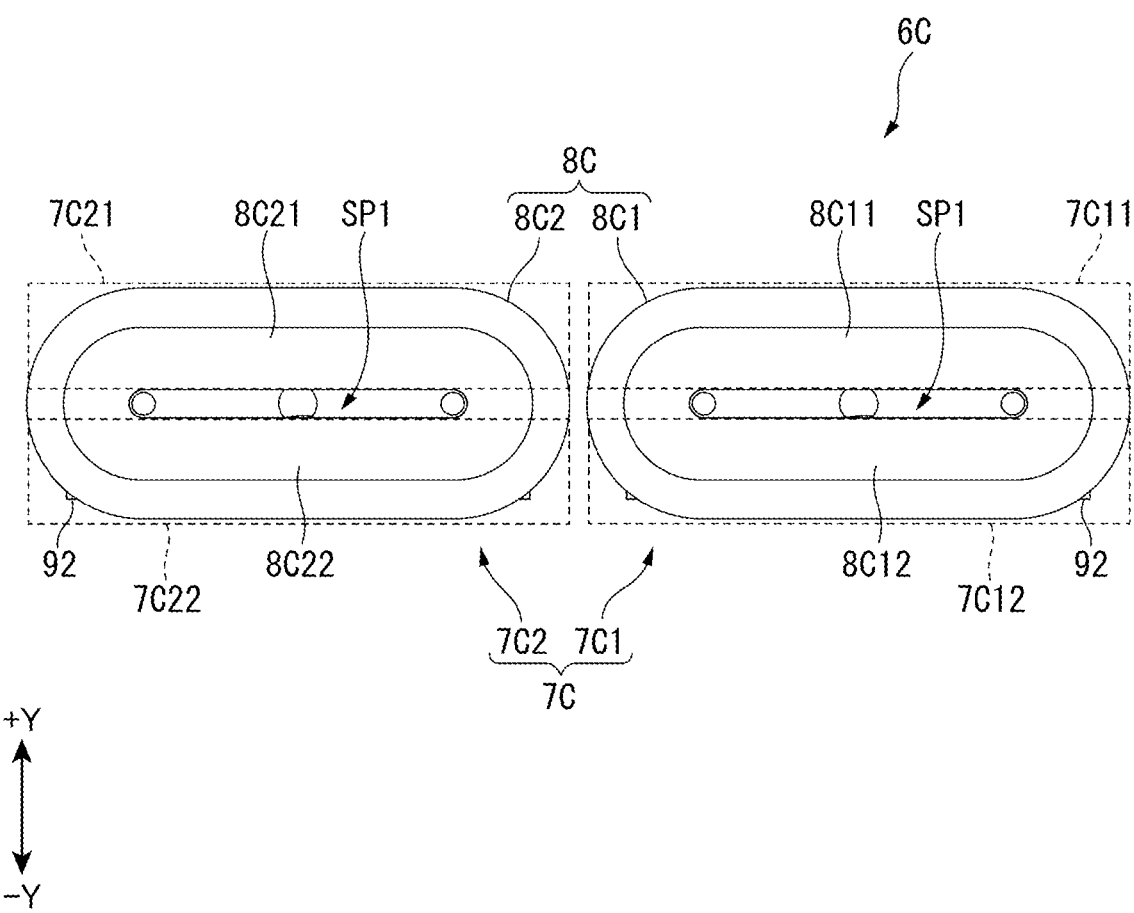
FIG. 13 is a view showing a driving unit according to a second modification of the first embodiment.

FIG. 13 is a view showing a driving unit 6C that is a second modification of the driving unit 6A. More specifically, FIG. 13 is a view showing the driving unit 6C as viewed from an opposite side of a magnet 7C from a coil 8C.

For example, the vibration generation device 3A may include the driving unit 6C shown in FIG. 13 instead of the driving unit 6A. That is, at least one of the first driving unit 61 and the second driving unit 62 may include the following configuration of the driving unit 6C.

The driving unit 6C has the same configuration and function as those of the driving unit 6A except that the driving unit 6C includes the magnet 7C and the coil 8C instead of the magnet 7A and the coil 8A.

Configuration of Coil

First, the coil 8C will be described.

The coil 8C generates a magnetic force when an AC current flows from a control unit (not shown). The coil 8C includes a first coil 8C1 and a second coil 8C2 disposed in parallel with the first coil 8C1 along a longitudinal axis of the first coil 8C1.

Each of the first coil 8C1 and the second coil 8C2 is an air-core coil formed by winding a conductive wire in a planar manner in a track shape or an oval shape having the longitudinal axis in the same direction when viewed from a position facing each of the first coil 8C1 and the second coil 8C2. A dimension of the first coil 8C1 along the longitudinal axis is larger than a dimension of the first coil 8C1 along the +Y direction orthogonal to the longitudinal axis, and a dimension of the second coil 8C2 along the longitudinal axis is larger than a dimension of the second coil 8C2 along the +Y direction orthogonal to the longitudinal axis.

Similarly to the coil 8A, the first coil 8C1 includes a first extending portion 8C11 and a second extending portion 8C12 extending along the longitudinal axis of the first coil 8C1.

The first extending portion 8C11 is disposed in the +Y direction with respect to an air-core portion SP1 of the first coil 8C1. The second extending portion 8C12 is disposed at a side opposite from the first extending portion 8C11 with the air-core portion SP1 of the first coil 8C1 sandwiched therebetween. That is, the second extending portion 8C12 is disposed in the −Y direction with respect to the first extending portion 8C11. A dimension of the second extending portion 8C12 along the longitudinal axis of the first coil 8C1 is substantially the same as a dimension of the first extending portion 8C11 along the longitudinal axis of the first coil 8C1.

In the embodiment, the second coil 8C2 is a coil having the same configuration and the same dimension as those of the first coil 8C1. That is, the second coil 8C2 includes a first extending portion 8C21 similar to the first extending portion 8C11 and a second extending portion 8C22 similar to the second extending portion 8C12.

Each of the first coil 8C1 and the second coil 8C2 is an air-core coil having no core as described above, and may be a coil having a core.

Similarly to the control unit according to the first embodiment, a control unit provided in the driving unit 6C is electrically coupled to the operation control unit 26 of the vibration reduction device 2, generates a magnetic force by causing an AC current supplied from the operation control unit 26 to flow through the coil 8C, and thereby swinging the pendulum 5A including the magnet 7C. Specifically, the control unit causes the AC current to flow through the first coil 8C1 and the second coil 8C2 such that the first extending portions 8C11 and 8C21 have the same magnetic pole and the second extending portions 8C12 and 8C22 have the same magnetic pole.

Configuration of Magnet

The magnet 7C includes a first magnet 7C1 and a second magnet 7C2 disposed in parallel with the first magnet 7C1 along a longitudinal axis of the first magnet 7C1.

The first magnet 7C1 is disposed to face the first coil 8C1 in a non-contact manner, and the second magnet 7C2 is disposed to face the second coil 8C2 in a non-contact manner.

Similarly to the magnet 7A, the first magnet 7C1 includes a first magnet member 7C11 and a second magnet member 7C12. Each of the first magnet member 7C11 and the second magnet member 7C12 is formed in a substantially rectangular parallelepiped shape having a longitudinal axis substantially parallel to the longitudinal axis of the first magnet 7C1.

The first magnet member 7C11 is disposed to face the first extending portion 8C11 of the first coil 8C1.

The second magnet member 7C12 is disposed to be separated from the first magnet member 7C11 in the −Y direction, and is disposed to face the second extending portion 8C12 of the first coil 8C1.

A magnetic pole of a surface of the first magnet member 7C11 facing the first extending portion 8C11 is different from a magnetic pole of a surface of the second magnet member 7C12 facing the second extending portion 8C12. For example, the magnetic pole of the surface of the first magnet member 7C11 facing the first extending portion 8C11 is an S pole, and the magnetic pole of the surface of the second magnet member 7C12 facing the second extending portion 8C12 is an N pole.

Similarly to the first magnet 7C1, the second magnet 7C2 includes a first magnet member 7C21 and a second magnet member 7C22. Each of the first magnet member 7C21 and the second magnet member 7C22 is formed in a substantially rectangular parallelepiped shape having a longitudinal axis substantially parallel to a longitudinal axis of the second magnet 7C2.

The first magnet member 7C21 is disposed to face the first extending portion 8C21 of the second coil 8C2.

The second magnet member 7C22 is disposed to be separated from the first magnet member 7C21 in the −Y direction, and is disposed to face the second extending portion 8C22 of the second coil 8C2.

A magnetic pole of a surface of the first magnet member 7C21 facing the first extending portion 8C21 is different from a magnetic pole of a surface of the second magnet member 7C22 facing the second extending portion 8C22. For example, the magnetic pole of the surface of the first magnet member 7C21 facing the first extending portion 8C21 is an S pole, and the magnetic pole of the surface of the second magnet member 7C22 facing the second extending portion 8C22 is an N pole.

In the second modification, the magnetic pole of the surface of the first magnet member 7C11 facing the first extending portion 8C11 is the same as the magnetic pole of the surface of the first magnet member 7C21 facing the first extending portion 8C21. Further, the magnetic pole of the surface of the second magnet member 7C12 facing the second extending portion 8C12 is the same as the magnetic pole of the surface of the second magnet member 7C22 facing the second extending portion 8C22.

The control unit causes AC currents of the same frequency and the same phase to flow through the first coil 8C1 and the second coil 8C2 such that the first extending portions 8C11 and 8C21 have the same magnetic pole and the second extending portions 8C12 and 8C22 have the same magnetic pole.

Accordingly, the pendulum 5A can be swung around the rotation axis Rx while preventing the magnetic field generated by the first coil 8C1 and the magnetic field generated by the second coil 8C2 from interfering with each other.

For example, when the first coil 8C1 and the second coil 8C2 are sufficiently separated from each other, the control unit may cause the AC current to flow through the first coil 8C1 and the second coil 8C2 such that the first extending portions 8C11 and 8C21 have different magnetic poles and the second extending portions 8C12 and 8C22 have different magnetic poles.

In this case, the magnetic pole of the surface of the first magnet member 7C11 facing the first extending portion 8C11 may be different from the magnetic pole of the surface of the first magnet member 7C21 facing the first extending portion 8C21, and the magnetic pole of the surface of the second magnet member 7C12 facing the second extending portion 8C12 may be different from the magnetic pole of the surface of the second magnet member 7C22 facing the second extending portion 8C22.

Figure 14:
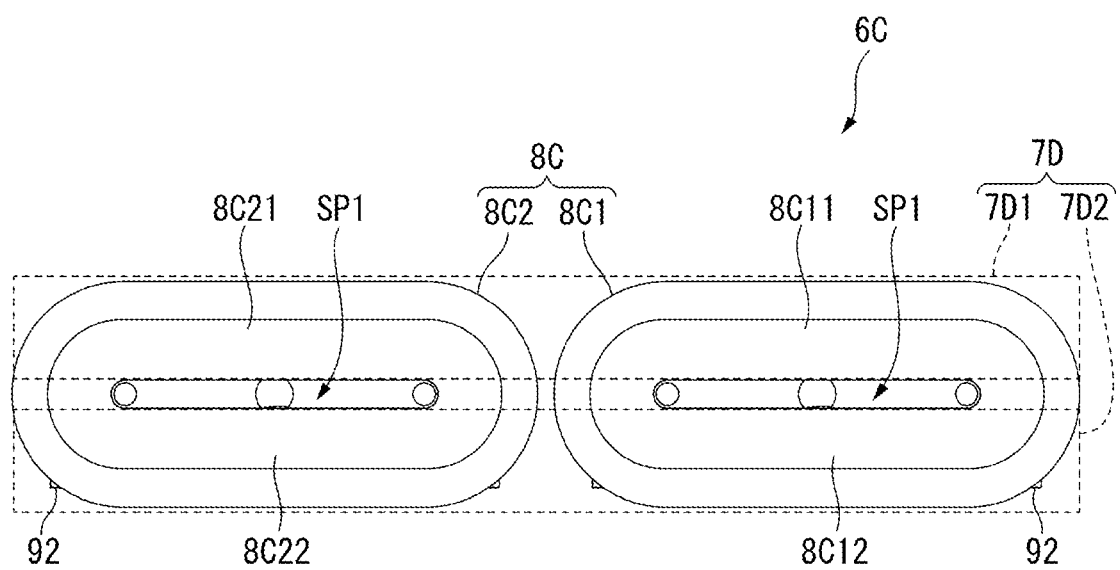
FIG. 14 is a view showing the driving unit according to the second modification of the first embodiment.

FIG. 14 is a view showing a magnet 7D that can be used in the driving unit 6C instead of the magnet 7C.

The driving unit 6C may use the magnet 7D shown in FIG. 14 instead of the magnet 7C. Unlike the magnet 7C including the first magnet 7C1 and the second magnet 7C2, the magnet 7D includes a first magnet member 7D1 and a second magnet member 7D2.

Each of the first magnet member 7D1 and the second magnet member 7D2 is formed in a substantially rectangular parallelepiped shape having a longitudinal axis along a direction in which the first coil 8C1 and the second coil 8C2 are arranged, and a dimension of the first magnet member 7D1 along the longitudinal axis and a dimension of the second magnet member 7D2 along the longitudinal axis substantially coincide with a dimension from an opposite-side end portion of the first coil 8C1 from the second coil 8C2 to an opposite-side end portion of the second coil 8C2 from the first coil 8C1.

The first magnet member 7D1 is disposed across the first extending portion 8C11 of the first coil 8C1 and the first extending portion 8C21 of the second coil 8C2, and the second magnet member 7D2 is disposed across the second extending portion 8C12 of the first coil 8C1 and the second extending portion 8C22 of the second coil 8C2.

A magnetic pole of a surface of the first magnet member 7D1 facing the first extending portions 8C11 and 8C21 is different from a magnetic pole of a surface of the second magnet member 7D2 facing the second extending portions 8C12 and 8C22. For example, the magnetic pole of the surface of the first magnet member 7D1 facing the first extending portions 8C11 and 8C21 is an S pole, and the magnetic pole of the surface of the second magnet member 7D2 facing the second extending portions 8C12 and 8C22 is an N pole.

A configuration similar to that of the driving unit 6C having the magnet 7D instead of the magnet 7C may be used in at least one of the first driving unit 61 and the second driving unit 62.

Figure 15:
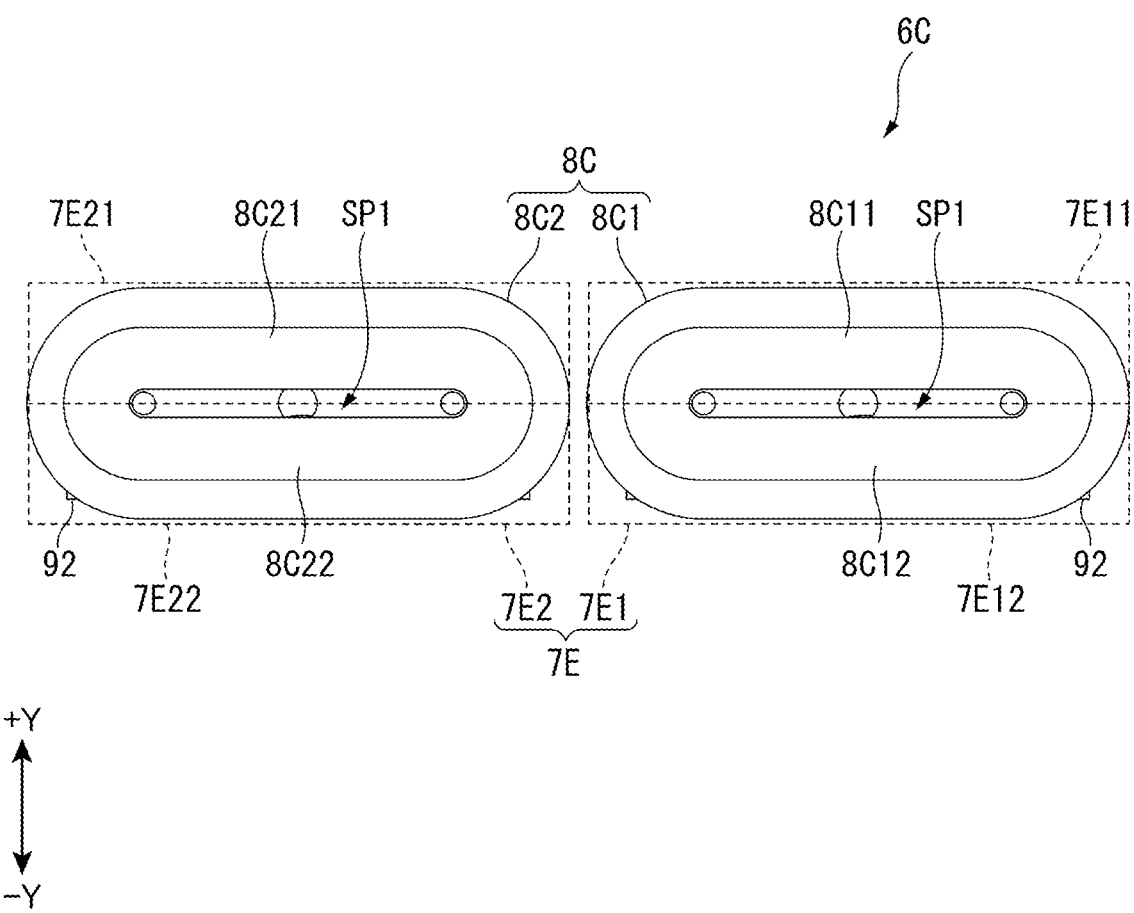
FIG. 15 is a view showing the driving unit according to the second modification of the first embodiment.

FIG. 15 is a view showing a magnet 7E that can be used in the driving unit 6C instead of the magnet 7C.

The driving unit 6C may use the magnet 7E shown in FIG. 15 instead of the magnet 7C. Unlike the magnet 7C including the first magnet 7C1 and the second magnet 7C2, the magnet 7E includes a first magnet 7E1 and a second magnet 7E2.

The first magnet 7E1 is formed in a substantially rectangular parallelepiped shape having a longitudinal axis substantially parallel to the longitudinal axis of the first coil 8C1. The second magnet 7E2 is formed in a substantially rectangular parallelepiped shape having a longitudinal axis substantially parallel to the longitudinal axis of the second coil 8C2. A dimension of the first magnet 7E1 along the longitudinal axis substantially coincides with the dimension of the first coil 8C1 along the longitudinal axis, and a dimension of the second magnet 7E2 along the longitudinal axis substantially coincides with the dimension of the second coil 8C2 along the longitudinal axis. A dimension of the first magnet 7E1 along the +Y direction orthogonal to the longitudinal axis substantially coincides with the dimension of the first coil 8C1 along the +Y direction, and a dimension of the second magnet 7E2 along the +Y direction substantially coincides with the dimension of the second coil 8C2 along the +Y direction.

The first magnet 7E1 faces the first coil 8C1 in a non-contact manner. The first magnet 7E1 includes a portion 7E11 facing the first extending portion 8C11 of the first coil 8C1 and a portion 7E12 facing the second extending portion 8C12 of the first coil 8C1. A magnetic pole of a surface of the portion 7E11 facing the first extending portion 8C11 is different from a magnetic pole of a surface of the portion 7E12 facing the second extending portion 8C12. For example, the magnetic pole of the surface of the portion 7E11 facing the first extending portion 8C11 is an S pole, and the magnetic pole of the surface of the portion 7E12 facing the second extending portion 8C12 is an N pole.

The second magnet 7E2 faces the second coil 8C2 in a non-contact manner. The second magnet 7E2 includes a portion 7E21 facing the first extending portion 8C21 of the second coil 8C2 and a portion 7E22 facing the second extending portion 8C22 of the second coil 8C2. A magnetic pole of a surface of the portion 7E21 facing the first extending portion 8C21 is different from a magnetic pole of a surface of the portion 7E22 facing the second extending portion 8C22. For example, the magnetic pole of the surface of the portion 7E21 facing the first extending portion 8C21 is an S pole, and the magnetic pole of the surface of the portion 7E22 facing the second extending portion 8C22 is an N pole.

A configuration similar to that of the driving unit 6C including the magnet 7E instead of the magnet 7C may be used in at least one of the first driving unit 61 and the second driving unit 62.

As described above, depending on the direction of the current flowing through the first coil 8C1 and the second coil 8C2, the magnetic pole of the surface of the portion 7E11 facing the first extending portion 8C11 may be different from the magnetic pole of the surface of the portion 7E21 facing the first extending portion 8C21, and the magnetic pole of the surface of the portion 7E12 facing the second extending portion 8C12 may be different from the magnetic pole of the surface of the portion 7E22 facing the second extending portion 8C22.

Figure 16:
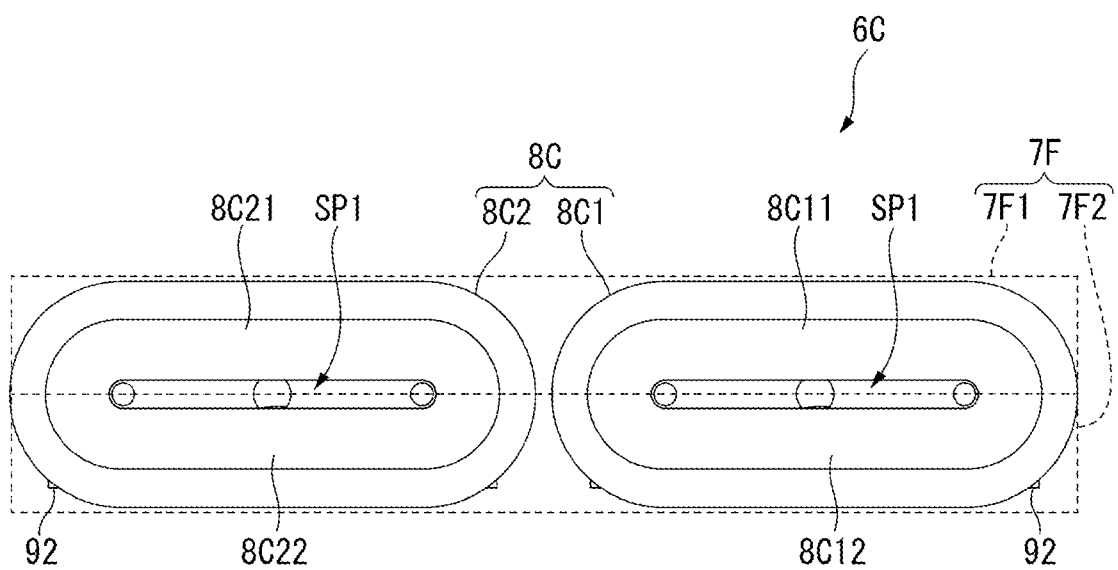
FIG. 16 is a view showing the driving unit according to the second modification of the first embodiment.

FIG. 16 is a view showing a magnet 7F that can be used in the driving unit 6C instead of the magnet 7C.

The driving unit 6C may use the magnet 7F shown in FIG. 16 instead of the magnet 7C. Unlike the magnet 7C including the first magnet 7C1 and the second magnet 7C2, the magnet 7F is a single magnet member.

The magnet 7F is formed in a substantially rectangular parallelepiped shape having a longitudinal axis along a direction in which the first coil 8C1 and the second coil 8C2 are arranged. A dimension of the magnet 7F along the longitudinal axis substantially coincides with the dimension from the opposite-side end portion of the first coil 8C1 from the second coil 8C2 to the opposite-side end portion of the second coil 8C2 from the first coil 8C1, and a dimension of the magnet 7F along the +Y direction orthogonal to the longitudinal axis substantially coincides with a dimension of the first coil 8C1 and the second coil 8C2 along the +Y direction.

The magnet 7F includes a portion 7F1 facing the first extending portion 8C11 of the first coil 8C1 and the first extending portion 8C21 of the second coil 8C2, and a portion 7F2 facing the second extending portion 8C12 of the first coil 8C1 and the second extending portion 8C22 of the second coil 8C2. A magnetic pole of a surface of the portion 7F1 facing the first extending portions 8C11 and 8C21 is different from a magnetic pole of a surface of the portion 7F2 facing the second extending portions 8C12 and 8C22. For example, the magnetic pole of the surface of the portion 7F1 facing the first extending portions 8C11 and 8C21 is an S pole, and the magnetic pole of the surface of the portion 7F2 facing the second extending portions 8C12 and 8C22 is an N pole.

A configuration similar to that of the driving unit 6C including the magnet 7F instead of the magnet 7C may be used in at least one of the first driving unit 61 and the second driving unit 62.

Third Modification of First Embodiment

In the vibration generation device 3A described above, the pendulum 5A is supported swingably around the rotation axis Rx by the pair of support portions 41 provided at the end portion of the base 4A in the −Z direction. In other words, the pair of support portions 41 that support the pendulum 5A swingably around the rotation axis Rx are provided at the end portion of the base 4A in the −Z direction. However, the pair of support portions 41 are not limited thereto, and may be provided closer to the +Z direction than is the end portion of the base 4A in the −Z direction.

Figure 17:
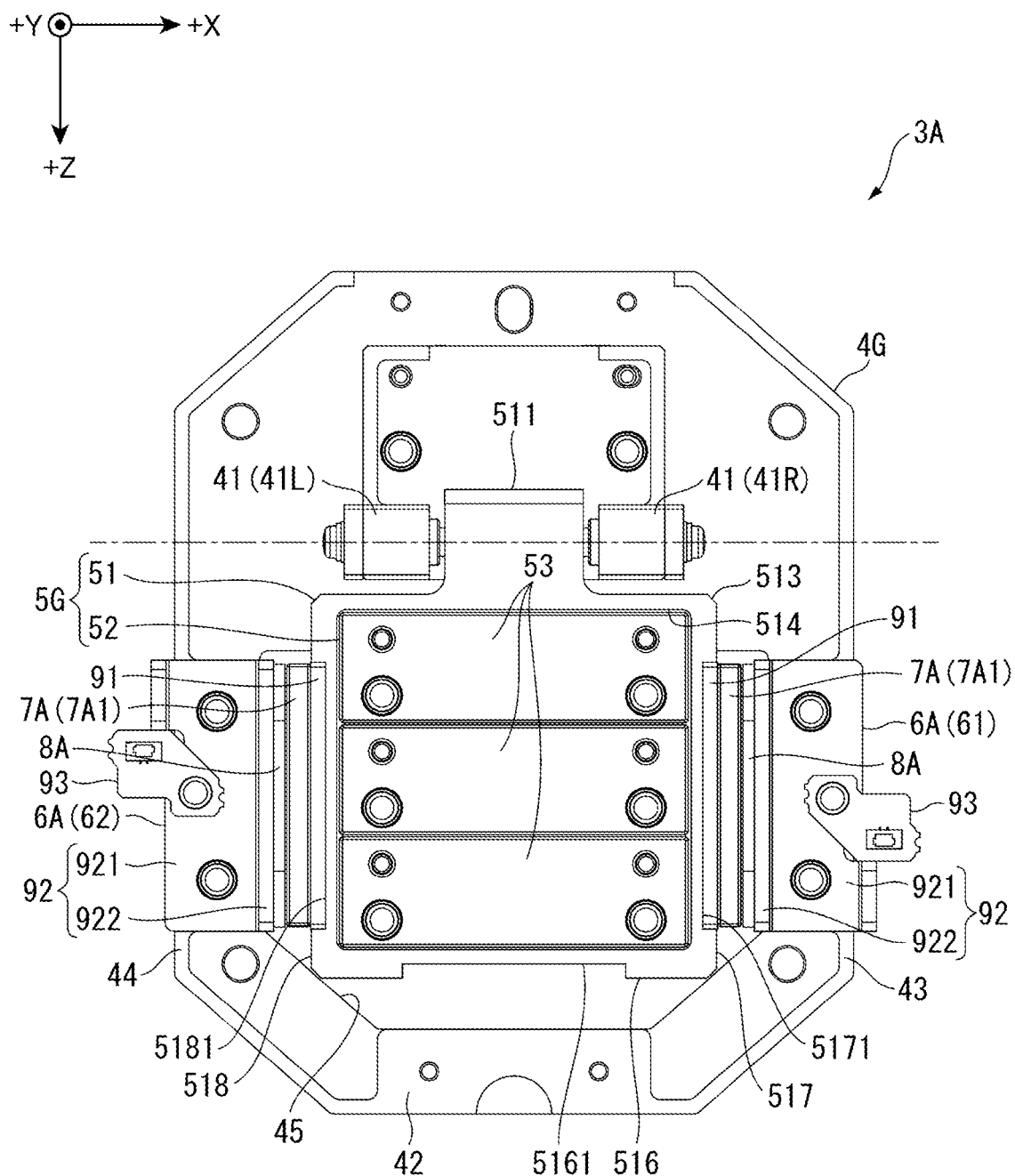
FIG. 17 is a view showing a vibration generation device according to a third modification of the first embodiment.

FIG. 17 is a plan view showing a third modification of the vibration generation device 3A. Specifically, FIG. 17 is a plan view showing a base 4G and a pendulum 5G that are deformations of the base 4A and the pendulum 5A of the vibration generation device 3A.

For example, the vibration generation device 3A may use the base 4G and the pendulum 5G shown in FIG. 17 instead of the base 4A and the pendulum 5A. The base 4G is different from the base 4A in positions of the pair of support portions 41, and the pendulum 5G is different from the pendulum 5A in a dimension between the coupling portion 511 and the enlarged portion 513.

Specifically, in the base 4G, the pair of support portions 41 are disposed closer to the +Z direction than is an end portion of the base 4G in the −Z direction. That is, the pair of support portions 41 are provided at positions between the end portion of the base 4G in the −Z direction and the relief portion 45.

Further, depending on the positions of the pair of support portions 41 in the base 4G, the dimension between the coupling portion 511 and the enlarged portion 513 in the pendulum 5G is smaller than a dimension between the coupling portion 511 and the enlarged portion 513 in the pendulum 5A. That is, the pendulum 5G does not include the extending portion 512 coupled from the coupling portion 511 to the enlarged portion 513, and includes the enlarged portion 513 and a portion that is coupled to the enlarged portion 513 and supported by the pair of support portions 41. An end portion of the enlarged portion 513 in the −Z direction is adjacent to the pair of support portions 41.

According to the vibration generation device 3A as well in which such a base 4G and such a pendulum 5G are used, the same effects as those described above can be achieved, and a size of the vibration generation device 3A can be reduced.

Fourth Modification of First Embodiment

The vibration generation device 3A described above includes the first driving unit 61 and the second driving unit 62, which are the driving unit 6A. However, the vibration generation device 3A is not limited thereto, and may include one of the first driving unit 61 and the second driving unit 62. For example, the vibration generation device 3A may include only the first driving unit 61 or only the second driving unit 62.

Second Embodiment

Next, a second embodiment according to the present disclosure will be described.

A projector according to the embodiment has the same configuration as that of the projector 1 according to the first embodiment, and is different from the projector 1 according to the first embodiment in that a vibration generation device further includes a tip-end-side driving unit. In the following description, the same or substantially the same parts as those described above are denoted by the same reference numerals, and the description thereof will be omitted.

Figure 18:
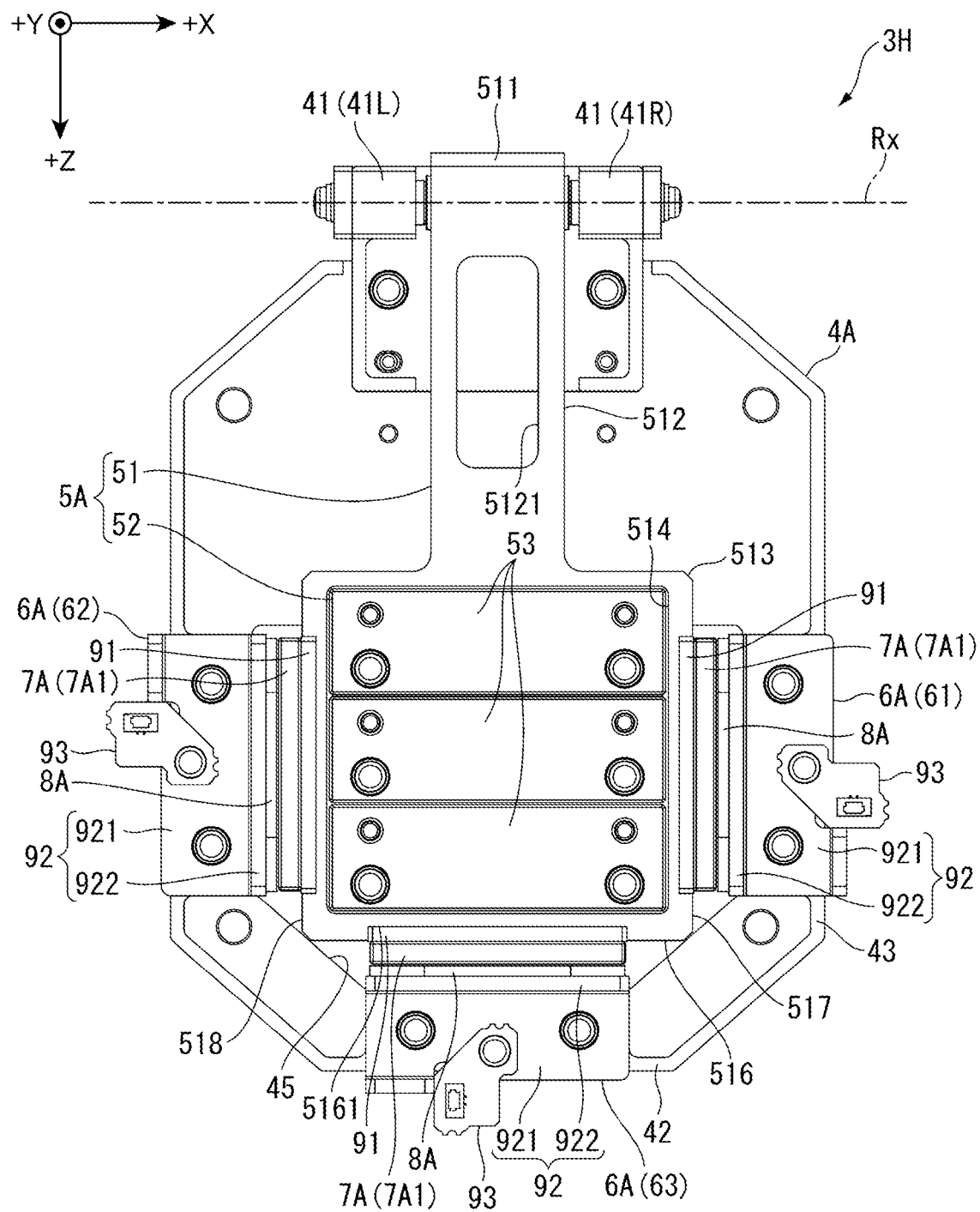
FIG. 18 is a plan view showing a vibration generation device according to a second embodiment.

FIG. 18 is a plan view of a vibration generation device 3H provided in a vibration reduction device of the projector according to the embodiment as viewed from the +Y direction.

The projector according to the embodiment has the same configuration and function as those of the projector 1 according to the first embodiment except that the projector according to the embodiment includes the vibration generation device 3H shown in FIG. 18 instead of the vibration generation device 3A. That is, the vibration reduction device according to the embodiment has the same configuration and function as those of the vibration reduction device 2 according to the first embodiment except that the vibration reduction device according to the embodiment includes the vibration generation device 3H instead of the vibration generation device 3A.

The vibration generation device 3H has the same configuration and function as those of the vibration generation device 3A according to the first embodiment except that the vibration generation device 3H further includes a tip-end-side driving unit 63. That is, the vibration generation device 3H includes the base 4A, the pendulum 5A, and a plurality of driving units 6A, and the plurality of driving units 6A include the first driving unit 61, the second driving unit 62, and the tip-end-side driving unit 63.

Configuration of Tip-End-Side Driving Unit

The tip-end-side driving unit 63 is provided in the +Z direction with respect to the pendulum 5A, and swings the pendulum 5A around the rotation axis Rx together with the first driving unit 61 and the second driving unit 62. That is, the tip-end-side driving unit 63 is provided at a position different from those of the first driving unit 61 and the second driving unit 62. Similarly to the first driving unit 61 and the second driving unit 62, the tip-end-side driving unit 63 includes the magnet 7A, the coil 8A, the plate member 91, the holding member 92, and the terminal portion 93, and further includes a control unit (not shown).

In the tip-end-side driving unit 63, the plate member 91 is attached to the attachment portion 5161 provided at the tip end portion 516 of the arm 51.

The first magnet member 7A1 and the second magnet member 7A2 constituting the magnet 7A are fixed to a surface of the plate member 91 in the +Z direction such that a longitudinal axis of each of the magnet members 7A1 and 7A2 is along the +X direction. That is, the magnet 7A of the tip-end-side driving unit 63 is provided at the tip end portion 516 to be separated from the rotation axis Rx.

The first plate-shaped portion 921 of the holding member 92 is fixed to the fixing portion 42 of the base 4A.

The coil 8A is attached to a surface of the second plate-shaped portion 922 of the holding member 92 facing the magnet 7A in the −Z direction to face the magnet 7A in a non-contact manner. Specifically, the coil 8A is disposed such that the first extending portion 8A1 faces the first magnet member 7A1 in the +Z direction in a non-contact manner and the second extending portion 8A2 faces the second magnet member 7A2 in the +Z direction in a non-contact manner.

As described above, a magnetic pole of a surface of the first magnet member 7A1 facing the first extending portion 8A1 is different from a magnetic pole of a surface of the second magnet member 7A2 facing the second extending portion 8A2.

Synchronization of First Driving Unit, Second Driving Unit, and Tip-End-Side Driving Unit The control unit of the tip-end-side driving unit 63 causes the coil 8A to generate a magnetic field by causing an AC current to flow through the coil 8A of the tip-end-side driving unit 63. At this time, the control units of the driving units 61 to 63 cause AC currents of the same frequency and the same phase to flow through the coils 8A such that the first extending portions 8A1 of the coils 8A have the same magnetic pole and the second extending portions 8A2 of the coils 8A have the same magnetic pole.

Accordingly, at least one of the first driving unit 61, the second driving unit 62, and the tip-end-side driving unit 63 can be prevented from interfering with the swing of the pendulum 5A generated by another driving unit. In addition, since the pendulum 5A can be swung by a driving force of each of the driving units 61 to 63, a rotational torque when the pendulum 5A swings can be increased.

Depending on magnetic poles of the surfaces 7A11 of the first magnet members 7A1 facing the first extending portions 8A1 and magnetic poles of the surfaces 7A21 of the second magnet members 7A2 facing the second extending portions 8A2 in the driving units 61 to 63, the AC currents flowing through the coils 8A may not necessarily have the same phase. Further, the plurality of driving units 61 to 63 may share one control unit.

Effects of Second Embodiment

The projector according to the embodiment described above has the following effects in addition to the same effects as those of the projector 1 according to the first embodiment.

The vibration generation device 3H includes the tip-end-side driving unit 63 provided in at least one driving unit 6A. Specifically, the vibration generation device 3H includes the tip-end-side driving unit 63 in addition to the first driving unit 61 and the second driving unit 62. The tip-end-side driving unit 63 includes the magnet 7A as a tip-end-side magnet and the coil 8A as a tip-end-side coil. The magnet 7A is provided at the tip end portion 516 of the pendulum 5A, and the coil 8A is disposed to face the magnet 7A in a non-contact manner.

According to such a configuration, since the pendulum 5A can be swung by the plurality of driving units 61 to 63, the swing of the pendulum 5A can be increased, and a torque when the pendulum 5A swings can be increased. Therefore, vibration generated by the vibration generation device 3H can be increased.

Modification of Second Embodiment

The vibration generation device 3H described above includes the first driving unit 61, the second driving unit 62, and the tip-end-side driving unit 63. However, the vibration generation device 3H is not limited thereto, and may include one of the first driving unit 61 and the second driving unit 62, and the tip-end-side driving unit 63. Further, for example, the vibration generation device 3H may include only the tip-end-side driving unit 63, or may include only one of the first driving unit 61 and the second driving unit 62.

In the vibration generation device 3H, each of the driving units 61 to 63 includes the magnet 7A including the first magnet member 7A1 and the second magnet member 7A2. However, the driving units 61 to 63 are not limited thereto, and at least one of the driving units 61 to 63 may include the above-described magnet 7B instead of the magnet 7A.

In the vibration generation device 3H, each of the driving units 61 to 63 includes the coil 8A. However, the driving units 61 to 63 are not limited thereto, and at least one of the driving units 61 to 63 may include the coil 8C including the first coil 8C1 and the second coil 8C2 instead of the coil 8A. In this case, a magnet disposed to face the coil 8C in a non-contact manner may be one of the magnets 7C, 7D, 7E, and 7F.

The vibration generation device 3H includes the base 4A and the pendulum 5A. However, the vibration generation device 3H is not limited thereto, and may include the base 4G and the pendulum 5G instead of the base 4A and the pendulum 5A.

Third Embodiment

Next, a third embodiment according to the present disclosure will be described.

A projector according to the embodiment has the same configuration as that of the projector 1 according to the first embodiment, and is different from the projector 1 according to the first embodiment in that a vibration generation device includes driving units disposed at an opposite side of a rotation axis of a pendulum from a first driving unit and a second driving unit. In the following description, the same or substantially the same parts as those described above are denoted by the same reference numerals, and the description thereof will be omitted.

Figure 19:
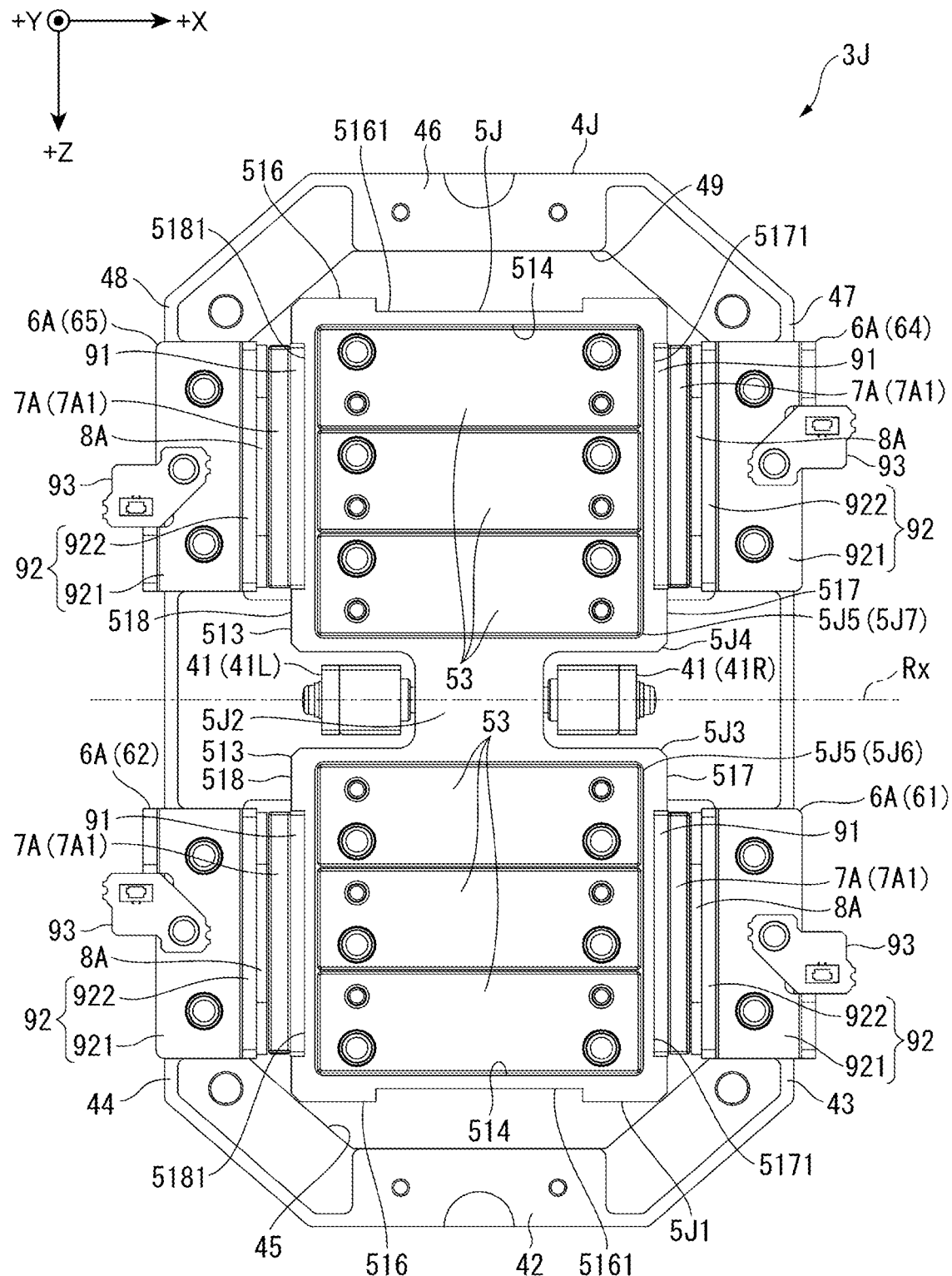
FIG. 19 is a plan view showing a vibration generation device according to a third embodiment.

FIG. 19 is a plan view of a vibration generation device 3J of a vibration reduction device provided in the projector according to the embodiment as viewed from the +Y direction.

The projector according to the embodiment has the same configuration and function as those of the projector 1 according to the first embodiment except that the projector according to the embodiment includes the vibration generation device 3J shown in FIG. 19 instead of the vibration generation device 3A. That is, the vibration reduction device according to the embodiment has the same configuration and function as those of the vibration reduction device 2 according to the first embodiment except that the vibration reduction device according to the embodiment includes the vibration generation device 3J instead of the vibration generation device 3A.

The vibration generation device 3J has the same configuration and function as those of the vibration generation device 3A according to the first embodiment except that the vibration generation device 3J includes a base 4J and a pendulum 5J instead of the base 4A and the pendulum 5A, and further includes a third driving unit 64 and a fourth driving unit 65. That is, the vibration generation device 3J includes the base 4J, the pendulum 5J, and a plurality of driving units 6A, and the plurality of driving units 6A include the first driving unit 61, the second driving unit 62, the third driving unit 64, and the fourth driving unit 65.

Configuration of Base

The base 4J supports the pendulum 5J swingably around the rotation axis Rx. The holding member 92 of each of the driving units 61, 62, 64, and 65 is fixed to the base 4J.

The base 4J has the same configuration and function as those of the base 4A except that the base 4J includes fixing portions 46, 47, and 48 and a relief portion 49. That is, the base 4J includes the pair of support portions 41, the fixing portions 42 to 44 and 46 to 48, and the relief portions 45 and 49.

In the base 4J, the pair of support portions 41 are provided at a center of the base 4J in the +Z direction with the pendulum 5J sandwiched therebetween along the +X direction.

The fixing portions 46 to 48 are provided on a side opposite from the fixing portions 42 to 44 with the pair of support portions 41 sandwiched therebetween. That is, the fixing portions 46 to 48 are provided at positions in the −Z direction with respect to the pair of support portions 41.

Among the fixing portions 46 to 48, the fixing portion 47 provided in the +X direction is a portion to which the holding member 92 of the third driving unit 64 is fixed, and the fixing portion 48 provided in the −X direction is a portion to which the holding member 92 of the fourth driving unit 65 is fixed. The fixing portion 46 provided in the −Z direction is a portion to which the holding member 92 of another driving unit can be fixed.

That is, the fixing portion 47 is a portion extending in the −Z direction, which is an extending direction of a second arm 5J4 from the rotation axis Rx, from an end portion of the pair of support portions 41 in the +X direction along the rotation axis Rx. The fixing portion 48 is a portion extending in the −Z direction, which is the extending direction of the second arm 5J4 from the rotation axis Rx, from an end portion of the pair of support portions 41 in the −X direction along the rotation axis Rx. The fixing portion 46 is a portion for coupling opposite-side end portions of the fixing portions 47 and 48 from the pair of support portions 41.

The relief portion 49 is a portion for preventing an end portion of the pendulum 5J in the −Z direction from coming into contact with the base 4J when the pendulum 5J swings. In the embodiment, similarly to the relief portion 45, the relief portion 49 is an opening penetrating the base 4J along the +Y direction. However, the relief portion 49 is not limited thereto, and may be a recess that opens in the +Y direction or the −Y direction.

Configuration of Pendulum

The pendulum 5J is supported by the base 4J swingably around the rotation axis Rx along the +X direction. The pendulum 5J includes an arm 5J1 and a weight portion 5J5.

The arm 5J1 is swingably supported by the base 4J. The arm 5J1 includes a coupling portion 5J2, a first arm 5J3, and the second arm 5J4. The weight portion 5J5 includes a first weight portion 5J6 of the first arm 5J3 and a second weight portion 5J7 of the second arm 5J4.

The coupling portion 5J2 is provided at a center of the pendulum 5J in the +Z direction orthogonal to the rotation axis Rx, and couples the first arm 5J3 and the second arm 5J4. The coupling portion 5J2 has the same configuration as that of the coupling portion 511, and is supported by the pair of support portions 41 swingably around the rotation axis Rx. Accordingly, the pendulum 5J is supported by the base 4J swingably around the rotation axis Rx.

The first arm 5J3 extends in the +Z direction from the coupling portion 5J2. Similarly to the pendulum 5A, the first arm 5J3 includes the enlarged portion 513, the disposition portions 514 and 515, the tip end portion 516, the first side surface portion 517, and the second side surface portion 518. In FIG. 19, illustration of the disposition portion 515 is omitted.

In the enlarged portion 513 of the first arm 5J3, the plate member 91 and the magnet 7A of the first driving unit 61 are attached to the first side surface portion 517 facing the +X direction. In the enlarged portion 513 of the first arm 5J3, the plate member 91 and the magnet 7A of the second driving unit 62 are attached to the second side surface portion 518 facing the −X direction.

The first weight portion 5J6 includes at least one weight portion member 53 fixed to at least one of the disposition portions 514 and 515 of the first arm 5J3.

The second arm 5J4 extends in the −Z direction from the coupling portion 5J2. That is, the second arm 5J4 extends from the rotation axis Rx in a direction opposite from a direction in which the first arm 5J3 extends from the rotation axis Rx. The second arm 5J4 has a structure linear symmetrical to that of the first arm 5J3 with respect to the rotation axis Rx. Specifically, the second arm 5J4 includes the enlarged portion 513, the disposition portions 514 and 515, the tip end portion 516, the first side surface portion 517, and the second side surface portion 518. In FIG. 19, illustration of the disposition portion 515 is omitted.

In the enlarged portion 513 of the second arm 5J4, the plate member 91 and the magnet 7A of the third driving unit 64 are attached to the first side surface portion 517 facing the +X direction. In the enlarged portion 513 of the second arm 5J4, the plate member 91 and the magnet 7A of the fourth driving unit 65 are attached to the second side surface portion 518 facing the −X direction.

The second weight portion 5J7 includes at least one weight portion member 53 fixed to at least one of the disposition portions 514 and 515 of the second arm 5J4.

Configuration and Disposition of Driving Unit

The third driving unit 64 and the fourth driving unit 65 correspond to a second-arm-side driving unit. The third driving unit 64 and the fourth driving unit 65 apply driving forces for swinging the pendulum 5J in the second arm 5J4. As described above, the third driving unit 64 and the fourth driving unit 65 are provided in the plurality of driving units 6A. That is, each of the driving units 61, 62, 64, and 65 includes the magnet 7A, the coil 8A, the plate member 91, the holding member 92, and the terminal portion 93, and further includes a control unit (not shown).

The first driving unit 61 and the second driving unit 62 of the vibration generation device 3J correspond to a first-arm-side driving unit.

In the first driving unit 61 of the vibration generation device 3J, the plate member 91 is attached to the first side surface portion 517 of the first arm 5J3. The first magnet member 7A1 and the second magnet member 7A2 constituting the magnet 7A are fixed to a surface of the plate member 91 in the +X direction such that longitudinal axes thereof are along the +Z direction. The first plate-shaped portion 921 of the holding member 92 is fixed to the fixing portion 43 of the base 4J. The coil 8A is attached to a surface of the second plate-shaped portion 922 of the holding member 92 in the −X direction to face the magnet 7A in a non-contact manner. In the first driving unit 61, a magnetic pole of a surface of the first magnet member 7A1 facing the first extending portion 8A1 is different from a magnetic pole of a surface of the second magnet member 7A2 facing the second extending portion 8A2.

In the second driving unit 62 of the vibration generation device 3J, the plate member 91 is attached to the second side surface portion 518 of the first arm 5J3. The first magnet member 7A1 and the second magnet member 7A2 constituting the magnet 7A are fixed to a surface of the plate member 91 in the −X direction such that longitudinal axes thereof are along the +Z direction. The first plate-shaped portion 921 of the holding member 92 is fixed to the fixing portion 44 of the base 4J. The coil 8A is attached to a surface of the second plate-shaped portion 922 of the holding member 92 in the +X direction to face the magnet 7A in a non-contact manner. In the second driving unit 62 as well, a magnetic pole of a surface of the first magnet member 7A1 facing the first extending portion 8A1 is different from a magnetic pole of a surface of the second magnet member 7A2 facing the second extending portion 8A2.

In the third driving unit 64 of the vibration generation device 3J, the plate member 91 is attached to the first side surface portion 517 of the second arm 5J4. The first magnet member 7A1 and the second magnet member 7A2 constituting the magnet 7A are fixed to a surface of the plate member 91 in the +X direction such that longitudinal axes thereof are along the +Z direction. That is, the magnet 7A is a second-arm-side magnet, and is provided at a position separated from the rotation axis Rx at the second arm 5J4. The first plate-shaped portion 921 of the holding member 92 is fixed to the fixing portion 47 of the base 4J. The coil 8A is attached to a surface of the second plate-shaped portion 922 of the holding member 92 facing the magnet 7A in the −X direction to face the magnet 7A in a non-contact manner. That is, the coil 8A is a second-arm-side coil and is disposed at a position facing the magnet 7A in a non-contact manner. In the third driving unit 64, a magnetic pole of a surface of the first magnet member 7A1 facing the first extending portion 8A1 is different from a magnetic pole of a surface of the second magnet member 7A2 facing the second extending portion 8A2.

In the fourth driving unit 65 of the vibration generation device 3J, the plate member 91 is attached to the second side surface portion 518 of the second arm 5J4. The first magnet member 7A1 and the second magnet member 7A2 constituting the magnet 7A are fixed to a surface of the plate member 91 in the −X direction such that longitudinal axes thereof are along the +Z direction. That is, the magnet 7A is the second-arm-side magnet, and is provided at a position separated from the rotation axis Rx at the second arm 5J4. The first plate-shaped portion 921 of the holding member 92 is fixed to the fixing portion 48 of the base 4J. The coil 8A is attached to a surface of the second plate-shaped portion 922 of the holding member 92 facing the magnet 7A in the +X direction to face the magnet 7A in a non-contact manner. That is, the coil 8A is the second-arm-side coil and is disposed at a position facing the magnet 7A in a non-contact manner. In the fourth driving unit 65, a magnetic pole of a surface of the first magnet member 7A1 facing the first extending portion 8A1 is different from a magnetic pole of a surface of the second magnet member 7A2 facing the second extending portion 8A2.

In this way, in the embodiment, the magnetic poles of the surfaces of the first magnet members 7A1 of the magnets 7A facing the first extending portions 8A1 are the same in the driving units 61, 62, 64, and 65, and the magnetic poles of the surfaces of the second magnet members 7A2 of the magnets 7A facing the second extending portions 8A2 are the same in the driving units 61, 62, 64, and 65.

Configuration of Control Unit

The control unit of each of the driving units 61, 62, 64, and 65 causes the coil 8A to generate a magnetic field by causing an AC current to flow through the corresponding coil 8A. At this time, each control unit causes an AC current of the same frequency to flow through each coil 8A such that the first extending portions 8A1 in the coils 8A of the driving units 61 and 62 disposed closer to the +Z direction than is the rotation axis Rx have the same magnetic pole and the first extending portions 8A1 in the coils 8A of the driving units 64 and 65 disposed closer to the −Z direction than is the rotation axis Rx have the same magnetic pole. At this time, each control unit causes an AC current, which is obtained by shifting a phase of the AC current flowing through the coil 8A of each of the driving units 61 and 62 by a half cycle, to flow through the coil 8A of each of the driving units 64 and 65 such that a magnetic pole of the first extending portion 8A1 of the coil 8A of each of the driving units 61 and 62 is different from a magnetic pole of the first extending portion 8A1 of the coil 8A of each of the driving units 64 and 65. That is, the control unit causes the AC currents of the same frequency to flow through the coils 8A such that directions of the magnetic fields generated in the coils 8A of the driving units 61 and 62 and directions of the magnetic fields generated in the coils 8A of the driving units 64 and 65 are opposite directions.

Accordingly, at least one of the driving units 61, 62, 64, and 65 can be prevented from interfering with the swing of the pendulum 5J generated by another driving unit. In addition, since the pendulum 5J can be swung by a driving force of each of the driving units 61, 62, 64, and 65, a rotational torque when the pendulum 5J swings can be increased. The driving units 61, 62, 64, and 65 may share the control unit.

The driving force of the pendulum 5J can be increased by disposing the weight portion members 53 disposed in the disposition portions 514 and 515 of the first arm 5J3 and the disposition portions 514 and 515 of the second arm 5J4 at positions separated from the rotation axis Rx of the pendulum 5J. Positions of the weight portion members 53 disposed in the disposition portions 514 and 515 of the first arm 5J3 from the rotation axis Rx and positions of the weight portion members 53 disposed in the disposition portions 514 and 515 of the second arm 5J4 from the rotation axis Rx are symmetrically disposed with respect to the rotation axis Rx, and a position of a center of gravity of the pendulum 5J is disposed on the rotation axis Rx, and thus the pendulum 5J can be stably swung. Further, the weight portion members 53 are not limited to being disposed symmetrically. The positions or the number of the weight portion members 53 may be different between the first arm 5J3 and the second arm 5J4, and the position of the center of gravity of the pendulum 5J may be shifted from the rotation axis Rx.

Effects of Third Embodiment

The projector according to the embodiment described above has the following effects in addition to the same effects as those of the projector 1 according to the first embodiment.

In the vibration generation device 3J, the pendulum 5J includes the first arm 5J3 and the second arm 5J4. The first arm 5J3 extends in the +Z direction intersecting with the rotation axis Rx, and includes the tip end portion 516, the first side surface portion 517, and the second side surface portion 518. The +Z direction corresponds to a first direction. The second arm 5J4 extends in the −Z direction from the rotation axis Rx. In the embodiment, the second arm 5J4 includes the tip end portion 516, the first side surface portion 517, and the second side surface portion 518.

The vibration generation device 3J includes the plurality of driving units 6A, and the plurality of driving units 6A include the third driving unit 64 and the fourth driving unit 65. The third driving unit 64 includes the magnet 7A serving as the second-arm-side magnet and the coil 8A serving as the second-arm-side coil. In the third driving unit 64, the magnet 7A is provided at a position separated from the rotation axis Rx at the second arm 5J4, and the coil 8A is disposed to face the second-arm-side magnet in a non-contact manner. The fourth driving unit 65 also includes the magnet 7A serving as the second-arm-side magnet and the coil 8A serving as the second-arm-side coil. The magnet 7A of the first driving unit 61 is provided at the first side surface portion 517 of the first arm 5J3 by the plate member 91, and the magnet 7A of the second driving unit 62 is provided at the second side surface portion 518 of the first arm 5J3 by the plate member 91.

According to such a configuration, the pendulum 5J including the first arm 5J3 and the second arm 5J4 can be swung like a seesaw. At this time, the vibration generation device 3J can cause the driving force for swinging the pendulum 5J to act on the first arm 5J3 and the second arm 5J4 by the first driving unit 61 and the second driving unit 62 each including the magnet 7A provided at the first arm 5J3 and the third driving unit 64 and the fourth driving unit 65 each including the magnet 7A provided at the second arm 5J4. Therefore, the pendulum 5J can be stably swung.

Modification of Third Embodiment

In the vibration generation device 3J described above, each of the driving units 61, 62, 64, and 65 includes the magnet 7A including the first magnet member 7A1 and the second magnet member 7A2. However, the driving units 61, 62, 64, and 65 are not limited thereto, and at least one of the driving units 61, 62, 64, and 65 may include the magnet 7B instead of the magnet 7A.

In the vibration generation device 3J, each of the driving units 61, 62, 64, and 65 includes the coil 8A. However, the driving units 61, 62, 64, and 65 are not limited thereto, and at least one of the driving units 61, 62, 64, and 65 may include the coil 8C including the first coil 8C1 and the second coil 8C2 instead of the coil 8A. In this case, a magnet disposed to face the coil 8C in a non-contact manner may be one of the magnets 7C, 7D, 7E, and 7F.

The vibration generation device 3J includes the driving units 61, 62, 64, and 65. However, the vibration generation device 3J is not limited thereto, and may not include at least one of the driving units 61, 62, 64, and 65. For example, the vibration generation device 3J may include at least one of the driving units 61 and 62 and at least one of the driving units 64 and 65. The vibration generation device 3J may include another driving unit instead of or in addition to the driving units 64 and 65. As such another driving unit, at least one of the tip-end-side driving unit 63 and a driving unit including a magnet disposed at the tip end portion 516 of the second arm 5J4 and a coil fixed to the fixing portion 46 can be exemplified.

Fourth Embodiment

Next, a fourth embodiment according to the present disclosure will be described.

A projector according to the embodiment has the same configuration as that of the projector 1 according to the first embodiment, and is different from the projector 1 according to the first embodiment in that a pendulum constituting a vibration generation device is swingable by twisting a plate member fixed to a base. In the following description, the same or substantially the same parts as those described above are denoted by the same reference numerals, and the description thereof will be omitted.

Figure 20:
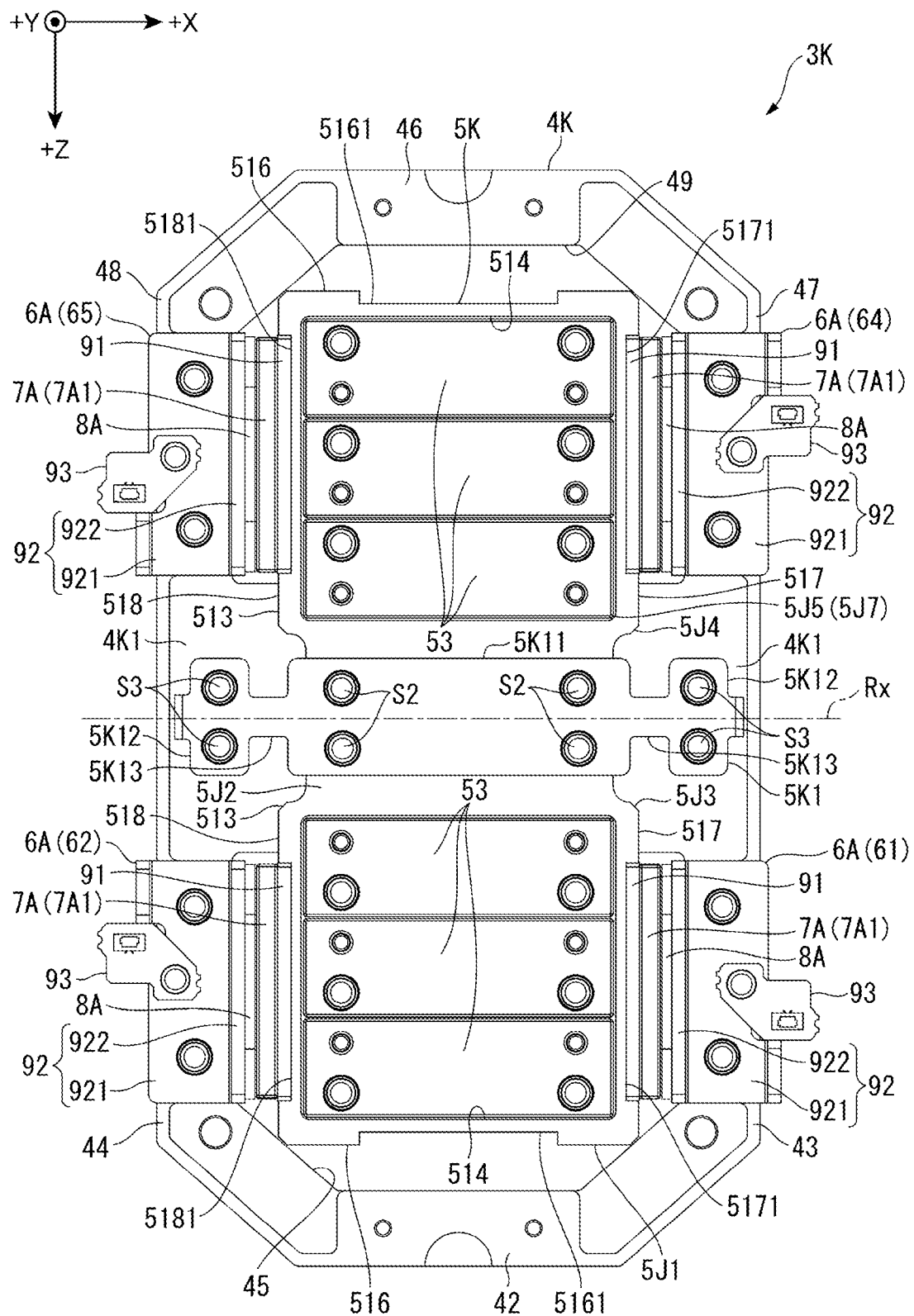
FIG. 20 is a plan view showing a vibration generation device according to a fourth embodiment.

FIG. 20 is a plan view of a vibration generation device 3K of a vibration reduction device provided in the projector according to the embodiment as viewed from the +Y direction.

The projector according to the embodiment has the same configuration and function as those of the projector 1 according to the first embodiment except that the projector according to the embodiment includes the vibration generation device 3K shown in FIG. 20 instead of the vibration generation device 3A. That is, the vibration reduction device according to the embodiment has the same configuration and function as those of the vibration reduction device 2 according to the first embodiment except that the vibration reduction device according to the embodiment includes the vibration generation device 3K instead of the vibration generation device 3A.

The vibration generation device 3K has the same configuration and function as those of the vibration generation device 3J according to the third embodiment except that the vibration generation device 3K includes a base 4K and a pendulum 5K instead of the base 4J and the pendulum 5J. That is, the vibration generation device 3K includes the base 4K, the pendulum 5K, and a plurality of driving units 6A, and the plurality of driving units 6A include the first driving unit 61, the second driving unit 62, the third driving unit 64, and the fourth driving unit 65.

Configuration of Base

The base 4K swingably supports the pendulum 5K, and is a plate-shaped member to which the holding member 92 of each of the driving units 61, 62, 64, and 65 is fixed. The base 4K has the same configuration and function as those of the base 4J except that the base 4K includes a pair of fixing portions 4K1 instead of the pair of support portions 41.

The pair of fixing portions 4K1 are provided at positions sandwiching the pendulum 5K at a center of the base 4K in the +Z direction. A pair of attachment portions 5K12 provided in a plate member 5K1 constituting the pendulum 5K is fixed to the pair of fixing portions 4K1.

Configuration of Pendulum

Similarly to the pendulum 5J, the pendulum 5K is attached to the base 4J swingably around the rotation axis Rx. The pendulum 5K has the same configuration as that of the pendulum 5J except that the pendulum 5K further includes the plate member 5K1. That is, the pendulum 5K includes the arm 5J1, the weight portion 5J5, and the plate member 5K1.

The plate member 5K1 is fixed to the base 4K along the +X direction, and constitutes the rotation axis Rx of the pendulum 5K. The plate member 5K1 includes a fixing portion 5K11, the pair of attachment portions 5K12, and a pair of torsion portions 5K13.

The fixing portion 5K11 is a portion of the plate member 5K1 that is fixed to the coupling portion 5J2 of the arm 5J1. The fixing portion 5K11 is provided at a center of the plate member 5K1 in the +X direction, and is fixed to a surface of the coupling portion 5J2 in the +Y direction by screws S2.

The pair of attachment portions 5K12 are provided at positions sandwiching the fixing portion 5K11 in the +X direction. Each of the pair of attachment portions 5K12 is fixed to the corresponding fixing portion 4K1 of the pair of fixing portions 4K1 by screws S3.

The pair of torsion portions 5K13 are disposed between the fixing portion 5K11 and the pair of attachment portions 5K12. Specifically, one torsion portion 5K13 of the pair of torsion portions 5K13 is provided between the fixing portion 5K11 and the attachment portion 5K12 of the pair of attachment portions 5K12 in the +X direction, and the other torsion portion 5K13 is provided between the fixing portion 5K11 and the attachment portion 5K12 of the pair of attachment portions 5K12 in the −X direction. The pair of torsion portions 5K13 linearly extend along the +X direction.

When the pendulum 5K is swung by the driving units 61, 62, 64, and 65, the pair of torsion portions 5K13 are twisted around an axis along the +X direction, thereby enabling swing of the pendulum 5K. That is, an extension line of an axis coupling the pair of torsion portions 5K13 is the rotation axis Rx of the pendulum 5K.

Effects of Fourth Embodiment

The projector according to the embodiment described above has the following effects in addition to the same effects as those of the projector according to the third embodiment.

In the vibration generation device 3K, the pendulum 5K includes the plate member 5K1 that is fixed to the base 4K and constitutes the rotation axis Rx.

According to such a configuration, the arm 5J1 of the pendulum 5K can be swingably attached to the base 4K with a simple configuration. Therefore, a configuration of the vibration generation device 3K can be simplified. In addition, since the arm 5J1 can be detached from the base 4K by detaching the plate member 5K1, the arm 5J1 can be easily replaced.

Modification of Fourth Embodiment

In the vibration generation device 3K described above, the plate member 5K1 includes the pair of torsion portions 5K13 along the +X direction. That is, the pair of torsion portions 5K13 extend linearly along the +X direction. However, the pair of torsion portions 5K13 are not limited thereto, and may have another shape.

Figure 21:
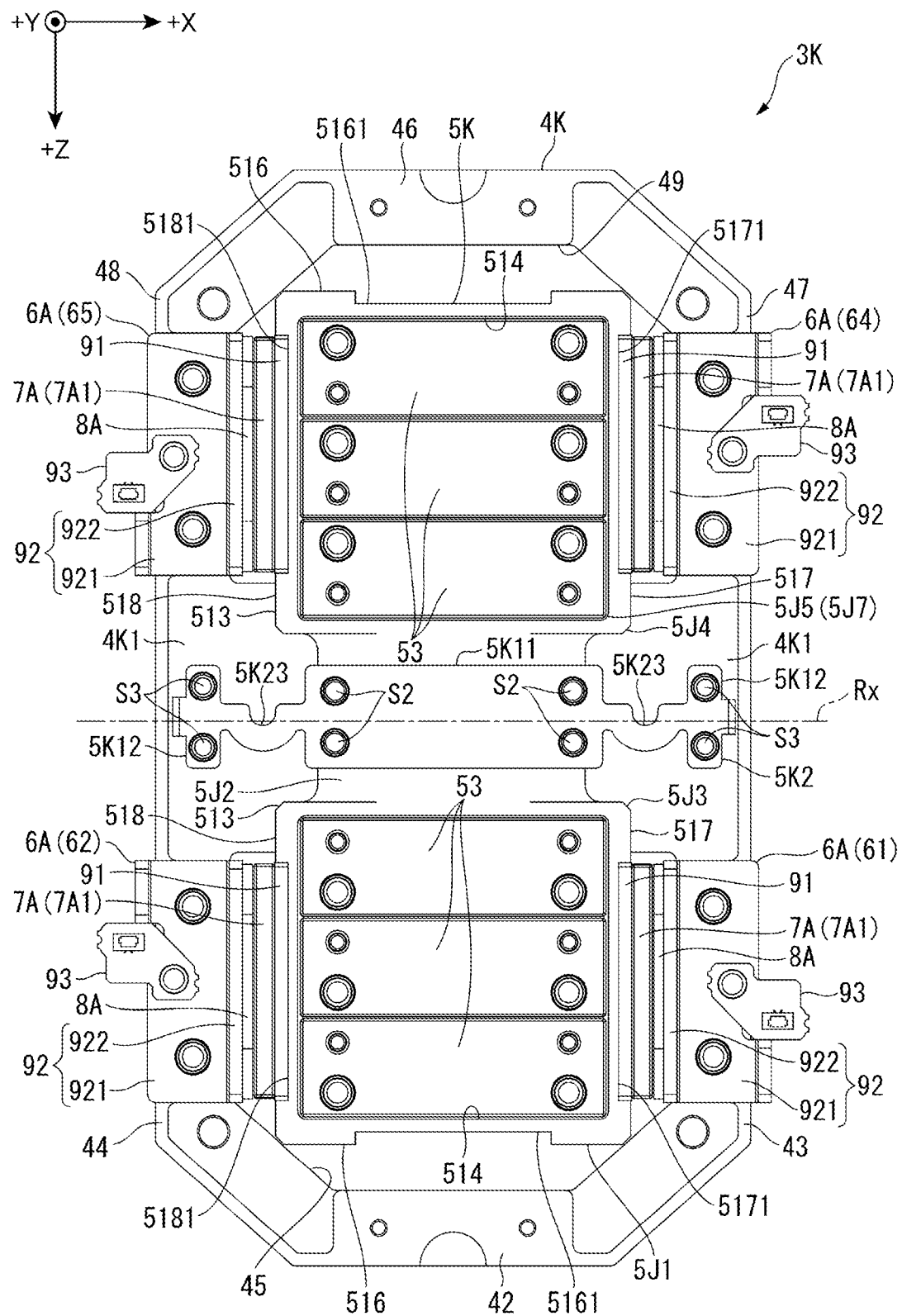
FIG. 21 is a view showing a vibration generation device according to a modification of the fourth embodiment.

FIG. 21 is a plan view showing a deformation of the vibration generation device 3K. Specifically, FIG. 21 is a plan view showing a plate member 5K2 that is a deformation of the plate member 5K1 of the vibration generation device 3K.

For example, the vibration generation device 3K may use the plate member 5K2 shown in FIG. 21 instead of the plate member 5K1.

Similarly to the plate member 5K1, the plate member 5K2 is fixed to the pair of fixing portions 4K1 of the base 4K and constitutes the rotation axis Rx of the pendulum 5K. The plate member 5K2 has the same configuration and function as those of the plate member 5K1 except that the plate member 5K2 includes a pair of torsion portions 5K23 instead of the pair of torsion portions 5K13. That is, the plate member 5K2 includes the fixing portion 5K11, the pair of attachment portions 5K12, and the pair of torsion portions 5K23.

Similarly to the pair of torsion portions 5K13, the pair of torsion portions 5K23 are disposed between the fixing portion 5K11 and the pair of attachment portions 5K12. When the arm 5J1 of the pendulum 5K is swung by the driving units 61, 62, 64, and 65, the pair of torsion portions 5K23 are twisted around an axis along the +X direction, thereby enabling swing of the pendulum 5K. That is, an extension line of an axis coupling the pair of torsion portions 5K23 is the rotation axis Rx of the pendulum 5K.

Each of the pair of torsion portions 5K23 is formed in a substantially U shape that opens in the +Z direction when viewed from the +Y direction. By forming the pair of torsion portions 5K23 in such a shape, a strength of the pair of torsion portions 5K23 can be increased.

Other Modifications of Fourth Embodiment

The vibration generation device 3K described above includes the driving units 61, 62, 64, and 65. However, the vibration generation device 3K is not limited thereto, and may not include at least one of the driving units 61, 62, 64, and 65. In other words, the vibration generation device 3K may include one of the driving units 61, 62, 64, and 65. For example, the vibration generation device 3K may include at least one of the driving units 61 and 62 and at least one of the driving units 64 and 65. The vibration generation device 3K may include another driving unit instead of or in addition to the driving units 64 and 65.

As such another driving unit, at least one of the tip-end-side driving unit 63 and a driving unit including a magnet disposed at the tip end portion 516 of the second arm 5J4 and a coil fixed to the fixing portion 46 can be exemplified.

Further, the vibration generation device 3K includes the driving units 61, 62, 64, and 65 included in the plurality of driving units 6A. However, the vibration generation device 3K is not limited thereto, and a driving unit provided in the vibration generation device 3K may include the driving unit 6C. When the driving unit 6C is used, a magnet and a coil provided in the driving unit 6C may be any of the magnets and the coils described above.

Modification of Embodiment

The present disclosure is not limited to the embodiments and the modifications of the embodiments described above, and modifications, improvements, and the like within a range in which an object of the present disclosure can be achieved are included in the present disclosure.

In the first to third embodiments and the modifications of the first to third embodiments, the pendulum 5A, 5G, or 5J of the vibration generation device 3A, 3H, or 3J is swingably supported by the pair of support portions 41 provided at the base 4A, 4G, or 4J. However, the pendulum 5A, 5G, or 5J of the vibration generation device 3A, 3H, or 3J is not limited thereto, and may be supported at the base by the plate member 5K1 or 5K2 swingably around the rotation axis Rx.

In the fourth embodiment and the modifications of the fourth embodiment, the pendulum 5J or 5K of the vibration generation device 3K is swingably supported at the base 4K by the plate member 5K1 or 5K2. However, the pendulum 5J is not limited thereto, and may be swingably supported at the base 4K by support portions similar to the pair of support portions 41.

In the embodiments described above, the first side surface portion 517 and the second side surface portion 518 of the pendulum 5A, 5G, or 5J intersect with the rotation axis Rx. Specifically, the side surface portions 517 and 518 are parallel to a plane orthogonal to a direction parallel to the rotation axis Rx. However, the first side surface portion 517 and the second side surface portion 518 are not limited thereto, and at least one of the first side surface portion 517 and the second side surface portion 518 may be inclined with respect to the plane orthogonal to the direction parallel to the rotation axis Rx. That is, the phrase "intersecting with a direction parallel to the rotation axis" includes a case of being parallel to the plane orthogonal to the direction parallel to the rotation axis and a case of being inclined with respect to the plane orthogonal to the direction parallel to the rotation axis.

In the embodiments described above, the coil 8A or 8C is fixed to the base 4A, 4G, 4J, or 4K by the holding member 92. However, the coil 8A or 8C is not limited thereto, and may be fixed to a configuration other than the base 4A, 4G, 4J, or 4K, for example, to the frame 23.

Further, the holding member 92 may not function as a yoke for the coil 8A. Similarly, the plate member 91 may not function as a yoke for the magnet 7A, 7B, 7C, 7D, 7E, or 7F.

In the embodiments described above, examples in which the vibration reduction device 2 including the vibration generation device 3A, 3H, 3J, or 3K is applied to the projector 1 which is an electronic apparatus are described. However, the electronic apparatus to which the vibration reduction device 2 is applied is not limited to the projector, and the vibration reduction device 2 may be applied to other electronic apparatuses.

In addition, the vibration generation device according to the present disclosure may be used alone as a device that generates vibration, or may be used in the electronic apparatus.

Summary of Present Disclosure

The present disclosure will be summarized as follows.

A vibration generation device according to a first aspect of the present disclosure includes: a base configured to transmit vibration to an object; a pendulum provided at the base swingably around a rotation axis; and at least one driving unit including a magnet that is provided at the pendulum and a coil that is provided at a configuration other than the pendulum and that is disposed to face the magnet in a non-contact manner, and configured to apply a driving force to the pendulum. The pendulum includes a tip end portion that is an end portion on an opposite side of a center of the pendulum extending from the rotation axis from the rotation axis in an extending direction in which the pendulum extends among directions intersecting with the rotation axis, and a first side surface portion and a second side surface portion that intersect with a direction parallel to the rotation axis and are opposite-side end portions. The at least one driving unit includes a first driving unit. The first driving unit includes a first magnet that is the magnet and is provided at the first side surface portion to be separated from the rotation axis, and a first coil that is the coil and is disposed to face the first magnet in a non-contact manner.

According to such a configuration, the magnet facing the coil in a non-contact manner and acting on a magnetic force generated in the coil is provided at the pendulum. Accordingly, there is no need to provide, in the pendulum supported by the base swingably around the rotation axis, a wiring for supplying a current. Therefore, when the pendulum swings, a damage to the wiring for supplying the current to the coil can be prevented, and the pendulum can be reliably swung. Therefore, reliability of the vibration generation device can be improved.

In the first aspect, the at least one driving unit may include a second driving unit. The second driving unit may include a second magnet that is the magnet and is provided at the second side surface portion to be separated from the rotation axis, and a second coil that is the coil and is disposed to face the second magnet in a non-contact manner.

According to such a configuration, the vibration generation device includes at least the first driving unit and the second driving unit, and the pendulum is swung around the rotation axis by the first driving unit and the second driving unit. At this time, the first magnet provided in the first driving unit is provided at the first side surface portion in the pendulum, and the second magnet provided in the second driving unit is provided at the second side surface portion located at an opposite side of the pendulum from the first side surface portion. That is, the first driving unit and the second driving unit are provided with the pendulum sandwiched therebetween in a direction along the rotation axis. Accordingly, the pendulum can be stably swung.

In addition, since the pendulum can be swung by a plurality of driving units, swing of the pendulum can be increased, and a torque when the pendulum swings can be increased. Therefore, the vibration generated by the vibration generation device can be increased.

In the first aspect, the at least one driving unit may include a tip-end-side driving unit. The tip-end-side driving unit may include a tip-end-portion-side magnet that is the magnet and is provided at the tip end portion, and a tip-end-portion-side coil that is the coil and is disposed to face the tip-end-portion-side magnet in a non-contact manner.

According to such a configuration, the vibration generation device includes at least the first driving unit and the tip-end-side driving unit, and the pendulum is swung around the rotation axis by the first driving unit and the tip-end-side driving unit. Accordingly, since the pendulum can be swung by the plurality of driving units, the swing of the pendulum can be increased, and the torque when the pendulum swings can be increased. Therefore, the vibration generated by the vibration generation device can be increased.

In the first aspect, the vibration generation device may further include a control unit configured to alternately switch directions of currents flowing through a plurality of the coils in synchronization with each other.

According to such a configuration, the control unit alternately switches a direction of a current flowing through the coil of the first driving unit and a direction of a current flowing through the coil of at least one of the second driving unit and the tip-end-side driving unit in synchronization with each other. Accordingly, a direction of the magnetic force generated in the coil can be alternately reversed. In addition, the magnetic force generated in the coil of at least one of the second driving unit and the tip-end-side driving unit can be prevented from interfering with the swing of the pendulum with respect to the magnetic force generated in the coil of the first driving unit. Therefore, the pendulum can be stably swung by the magnetic force generated in the coil of the first driving unit and the magnetic force generated in the coil of at least one of the second driving unit and the tip-end-side driving unit, and the torque when the pendulum swings can be increased.

In the first aspect, the coil may be attached to the base.

According to such a configuration, the coil can be stably disposed at a position facing the magnet in a non-contact manner.

In the first aspect, the vibration generation device may include at least one of a magnet-side yoke provided at an opposite-side position of the magnet from the coil and a coil-side yoke provided at an opposite-side position of the coil from the magnet.

According to such a configuration, an attraction force of the magnet can be increased by the magnet-side yoke, and the magnetic force generated in the coil can be directed toward the magnet by the coil-side yoke. Therefore, since interaction between the magnetic force generated in the coil and the magnet provided in the pendulum can be strengthened, the current flowing through the coil for swinging the pendulum can be reduced.

In the first aspect, the coil-side yoke may be a ferromagnetic holding member holding the coil.

According to such a configuration, since the coil is held by the coil-side yoke, there is no need to separately provide a member for holding the coil and the coil-side yoke. Therefore, an increase in the number of components of the vibration generation device can be prevented.

In the first aspect, the coil may be an air-core coil having a longitudinal axis, and the magnet may be disposed along the longitudinal axis of the coil and face the coil in a non-contact manner.

According to such a configuration, a cost of the coil can be reduced as compared with a coil having a core, and therefore a manufacturing cost of the vibration generation device can be reduced.

In addition, since the magnet is disposed along the longitudinal axis of the coil, a surface of the magnet acting on the magnetic force generated in the coil can be easily enlarged, and interaction between the coil and the magnet can be enhanced.

In the first aspect, the coil may include a first extending portion extending along the longitudinal axis, and a second extending portion that extends along the longitudinal axis and through which a current flows in a direction opposite from that of the first extending portion. A magnetic pole of a surface of the magnet facing the first extending portion may be different from a magnetic pole of a surface of the magnet facing the second extending portion.

According to such a configuration, the direction of the magnetic force generated in the coil is alternately changed, and therefore the pendulum to which the magnet is fixed can be reliably swung.

In the first aspect, a center of gravity of the pendulum may be located closer to a tip-end-portion-side than is a middle of a distance from the rotation axis to the tip end portion.

According to such a configuration, the torque generated when the pendulum swings can be adjusted. Therefore, the vibration generated by the vibration generation device can be increased.

In the first aspect, the pendulum may include a disposition portion, at which a weight portion is configured to be disposed, at a position separated from the rotation axis toward a tip-end-portion-side.

According to such a configuration, since a weight and a position of a center of gravity of the pendulum can be adjusted by adjusting a weight and a disposition of the weight portion provided at the disposition portion, the torque generated when the pendulum swings can be adjusted. Therefore, an amplitude of the vibration generated by the vibration generation device can be adjusted.

In the first aspect, the pendulum may include a first arm extending in a first direction intersecting with the rotation axis and including the tip end portion, the first side surface portion, and the second side surface portion, and a second arm extending from the rotation axis toward an opposite side from the first direction. The at least one driving unit may include a second-arm-side driving unit. The first magnet of the first driving unit may be provided at the first side surface portion of the first arm. The second-arm-side driving unit may include a second-arm-side magnet that is the magnet and is provided at a position separated from the rotation axis at the second arm, and a second-arm-side coil that is the coil and is disposed to face the second-arm-side magnet in a non-contact manner.

According to such a configuration, the pendulum including the first arm and the second arm can be swung like a seesaw. At this time, the vibration generation device includes at least the first driving unit including the magnet provided at the first side surface portion of the first arm, and the second-arm-side driving unit including the second-arm-side magnet provided at the second arm. Therefore, a driving force for swinging the pendulum can be applied to each of the first arm and the second arm. Therefore, the pendulum can be stably swung.

In the first aspect, the pendulum may include a plate member fixed to the base and constituting the rotation axis.

According to such a configuration, the pendulum can be swingably attached to the base with a simple configuration. Therefore, a configuration of the vibration generation device can be simplified.

In the first aspect, the base may include a relief portion configured to avoid contact with the pendulum.

According to such a configuration, noise due to the contact of the pendulum with the base can be prevented from occurring when the pendulum swings, and a stroke when the pendulum swings can be increased.

A vibration reduction device according to a second aspect of the present disclosure includes: the vibration generation device according to the first aspect; a detection unit configured to detect vibration of the object; and an operation control unit configured to cause the vibration generation device to generate vibration opposite in phase from the vibration detected by the detection unit.

According to such a configuration, the same effects as those of the vibration generation device according to the first aspect can be achieved. Further, since the vibration generation device can generate the vibration opposite in phase from the vibration detected by the detection unit, the vibration of an installation target of the vibration reduction device can be reduced.

An electronic apparatus according to a third aspect of the present disclosure includes the vibration reduction device according to the second aspect.

According to such a configuration, the same effects as those of the vibration reduction device according to the second aspect can be achieved, and the vibration of the electronic apparatus can be reduced.

In the third aspect, the electronic apparatus may further include a projection optical device configured to project an image. The vibration reduction device may be attached to the projection optical device.

According to such a configuration, the vibration of the projection optical device caused by an internal factor of the electronic apparatus or an external factor to the electronic apparatus can be reduced. Therefore, an image projected onto a projection surface by the projection optical device can be prevented from shaking.

What is claimed is:
1. A vibration generation device comprising:
   a base configured to transmit vibration to an object;
   a pendulum provided at the base swingably around a rotation axis; and
   at least one driving unit including
      a magnet that is provided at the pendulum, and
      a coil that is provided at a configuration other than the pendulum and that is disposed to face the magnet in a non-contact manner, and configured to apply a driving force to the pendulum, wherein the pendulum includes
- a tip end portion that is an end portion on an opposite side of a center of the pendulum extending from the rotation axis from the rotation axis in an extending direction in which the pendulum extends among directions intersecting with the rotation axis, and
- a first side surface portion and a second side surface portion that intersect with a direction parallel to the rotation axis and are opposite-side end portions, the at least one driving unit includes a first driving unit,
the first driving unit includes
- a first magnet that is the magnet and is provided at the first side surface portion to be separated from the rotation axis, and
- a first coil that is the coil and is disposed to face the first magnet in a non-contact manner, the at least one driving unit includes a second driving unit, and
the second driving unit includes
- a second magnet that is the magnet and is provided at the second side surface portion to be separated from the rotation axis, and
- a second coil that is the coil and is disposed to face the second magnet in a non-contact manner.

2. A vibration generation device comprising:
a base configured to transmit vibration to an object;
a pendulum provided at the base swingably around a rotation axis; and
at least one driving unit including
- a magnet that is provided at the pendulum, and
- a coil that is provided at a configuration other than the pendulum and that is disposed to face the magnet in a non-contact manner, and
configured to apply a driving force to the pendulum, wherein the pendulum includes
- a tip end portion that is an end portion on an opposite side of a center of the pendulum extending from the rotation axis from the rotation axis in an extending direction in which the pendulum extends among directions intersecting with the rotation axis, and
- a first side surface portion and a second side surface portion that intersect with a direction parallel to the rotation axis and are opposite-side end portions, the at least one driving unit includes a first driving unit,
the first driving unit includes
- a first magnet that is the magnet and is provided at the first side surface portion to be separated from the rotation axis, and
- a first coil that is the coil and is disposed to face the first magnet in a non-contact manner, the at least one driving unit includes a tip-end-side driving unit, and
the tip-end-side driving unit includes
- a tip-end-portion-side magnet that is the magnet and is provided at the tip end portion, and
- a tip-end-portion-side coil that is the coil and is disposed to face the tip-end-portion-side magnet in a non-contact manner.

3. The vibration generation device according to claim 1, further comprising:
a control unit configured to alternately switch directions of currents flowing through a plurality of the coils in synchronization with each other.

4. The vibration generation device according to claim 1, wherein
the coil is attached to the base.

5. The vibration generation device according to claim 1, further comprising:
at least one of a magnet-side yoke provided at an opposite-side position of the magnet from the coil and a coil-side yoke provided at an opposite-side position of the coil from the magnet.

6. The vibration generation device according to claim 5, wherein
the coil-side yoke is a ferromagnetic holding member holding the coil.

7. The vibration generation device according to claim 1, wherein
the coil is an air-core coil having a longitudinal axis, and
the magnet is disposed along the longitudinal axis of the coil and faces the coil in a non-contact manner.

8. The vibration generation device according to claim 7, wherein
the coil includes
- a first extending portion extending along the longitudinal axis, and
- a second extending portion that extends along the longitudinal axis and through which a current flows in a direction opposite from that of the first extending portion, and
- a magnetic pole of a surface of the magnet facing the first extending portion is different from a magnetic pole of a surface of the magnet facing the second extending portion.

9. The vibration generation device according to claim 1, wherein
a center of gravity of the pendulum is located closer to a tip-end-portion-side than is a middle of a distance from the rotation axis to the tip end portion.

10. The vibration generation device according to claim 1, wherein
the pendulum includes a disposition portion, at which a weight portion is configured to be disposed, at a position separated from the rotation axis toward a tip-end-portion-side.

11. A vibration generation device comprising:
a base configured to transmit vibration to an object;
a pendulum provided at the base swingably around a rotation axis; and
at least one driving unit including
- a magnet that is provided at the pendulum, and
- a coil that is provided at a configuration other than the pendulum and that is disposed to face the magnet in a non-contact manner, and
configured to apply a driving force to the pendulum, wherein the pendulum includes
- a tip end portion that is an end portion on an opposite side of a center of the pendulum extending from the rotation axis from the rotation axis in an extending direction in which the pendulum extends among directions intersecting with the rotation axis, and
- a first side surface portion and a second side surface portion that intersect with a direction parallel to the rotation axis and are opposite-side end portions, the at least one driving unit includes a first driving unit,
the first driving unit includes
- a first magnet that is the magnet and is provided at the first side surface portion to be separated from the rotation axis, and a first coil that is the coil and is disposed to face the first magnet in a non-contact manner, the pendulum includes a first arm extending in a first direction intersecting with the rotation axis and including the tip end portion, the first side surface portion, and the second side surface portion, and a second arm extending from the rotation axis toward an opposite side from the first direction, the at least one driving unit includes a second-arm-side driving unit, the first magnet of the first driving unit is provided at the first side surface portion of the first arm, and the second-arm-side driving unit includes a second-arm-side magnet that is the magnet and is provided at a position separated from the rotation axis at the second arm, and a second-arm-side coil that is the coil and is disposed to face the second-arm-side magnet in a non-contact manner.

12. The vibration generation device according to claim 1, wherein
the pendulum includes a plate member fixed to the base and constituting the rotation axis.

13. The vibration generation device according to claim 1, wherein
the base includes a relief portion configured to avoid contact with the pendulum.

14. A vibration reduction device comprising:
the vibration generation device according to claim 1;
a detection unit configured to detect vibration of the object; and
an operation control unit configured to cause the vibration generation device to generate vibration opposite in phase from the vibration detected by the detection unit.

15. An electronic apparatus comprising:
the vibration reduction device according to claim 14.

16. The electronic apparatus according to claim 15, further comprising:
a projection optical device configured to project an image, wherein the vibration reduction device is attached to the projection optical device.

* * * * *